(12) United States Patent
Yang

(10) Patent No.: US 8,571,351 B2
(45) Date of Patent: Oct. 29, 2013

(54) EVALUATING MAPPING BETWEEN SPATIAL POINT SETS

(76) Inventor: Tianzhi Yang, New York, NY (US)

(*) Notice: Subject to any disclaimer, the term of this patent is extended or adjusted under 35 U.S.C. 154(b) by 0 days.

(21) Appl. No.: 13/487,219

(22) Filed: Jun. 3, 2012

(65) Prior Publication Data

US 2012/0275722 A1 Nov. 1, 2012

(51) Int. Cl.
*G06K 9/32* (2006.01)
(52) U.S. Cl.
USPC .......................................................... 382/294
(58) Field of Classification Search
USPC .......... 382/173, 294, 154, 162; 324/307, 309; 356/601, 610; 348/36; 600/407, 409; 345/419, 582; 702/104; 715/747, 751
See application file for complete search history.

(56) References Cited

U.S. PATENT DOCUMENTS

| | | | |
|---|---|---|---|
| 6,640,201 B1 | 10/2003 | Hahlweg | |
| 6,853,373 B2 * | 2/2005 | Williams et al. | 345/419 |
| 7,010,158 B2 * | 3/2006 | Cahill et al. | 382/154 |
| 7,373,275 B2 | 5/2008 | Kraft | |
| 8,064,732 B2 * | 11/2011 | Xu et al. | 382/294 |
| 2010/0310177 A1 | 12/2010 | Xiong et al. | |

OTHER PUBLICATIONS

Yang & Keyes (2008). An Attine Energy Model for Image Registration Using Markov Chain Monte Carlo. Submitted to SIAM Journal of Imaging Science in Jul. 2008.
Linden (2011). A Triangulation-Based Approach to Nonrigid. Image Registration. Master Thesis C Wright. State University, [Online] Retrieved on Jul. 5, 2012, Retrievable from etd.ohiolink.edu/view.cgi?acc-num=wright1310502150.
Seetharaman & Gasperas, et al. (2000). A piece wise attine model for image registration in non-rigid motion analysis. Image Processing. 2000. Proceedings. 2000 International Conference on pp. 561-564 vol. 1.
Ourselin et al. (2001). Reconstructing a 3D. Structure from serial histological sections. Image and vision computing. vol. 19, Issues 1-2, Jan. 2001. pp. 25-31.
Dzza & Deza (2009) Encyclopedia of Distances. Springer-Verlag. Berlin. Heidelberg. pp. 311-315.

* cited by examiner

*Primary Examiner* — Anh Do

(57) ABSTRACT

A computer implemented method for evaluating a one-to-one mapping between a first spatial point set and a second spatial point set in nD comprising the steps of receiving a first and a second spatial point sets and a one-to-one mapping between the two spatial point sets; defining a spatial agent; generating multiple mapped (n+1)-combinations in the first point set; computing multiple affine transformations that transform the multiple mapped (n+1)-combinations to correspondents in the second point set; applying the multiple affine transformations to the spatial agent to generate multiple transformed spatial agents; and computing a distance measure using the multiple transformed spatial agents.

23 Claims, 19 Drawing Sheets

EVALUATING MAPPING BETWEEN SPATIAL POINT SETS

This invention was made with Government support under ITR 04-27464 awarded by the National Science Foundation. The Government has certain rights in this invention.

COPY RIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Prior Art

The following is a tabulation of some prior art that presently appears relevant

| U.S. Patents | | | |
| --- | --- | --- | --- |
| Pat. No. | Kind Code | Issue Date | Patentee |
| 6,640,201 | B1 | Oct. 28, 2003 | Hahlweg |
| 7,373,275 | B2 | May 13, 2008 | Kraft |
| 20100310177 | A1 | Dec. 9, 2010 | Xiong et al. |

NONPATENT LITERATURE DOCUMENTS

Yang, Tianzhi and Keyes, David E. (2008). An Affine Energy Model for Image Registration Using Markov Chain Monte Carlo. Submitted to SIAM Journal of Imaging Sciences in July 2008, in March 2009 we were told that it was rejected, in the mean while it has been placed on the first author's web page (http://www.columbia.edu/~ty2109) for a while, then removed.

Linden, Timothy R. (2011). A Triangulation-Based Approach to Nonrigid Image Registration. Masters Thesis (Wright State University). [online][retrieved on Jan. 31, 2012] Retrievable from http://rave.ohiolink.edu/etdc/view?acc_num=wright131.050215.50

Seetharaman, (G., G. Gasperas, et al. (2000). A piecewise affine model for image registration in nonrigid motion analysis. Image Processing, 2000. Proceedings. 2000 International Conference on.

Ourselin, S., A. Roche, et al. (2001). Reconstructing a 3D structure from serial histological sections. Image and Vision Computing 19(1-2): 25-31.

In image registration, one wants to align a template image with a reference image. In feature-based image registration methods, a finite set of feature points is selected from each image, then the features points of the template image are mapped to those of the reference image. A feature point typically represents an outstanding feature of an image, such as a corner of a shape, local maxima and minima of differences of Gaussians, and a point of maximal curvature. Feature points are usually 2D or 3D spatial points that carry with them feature specific information in addition to their coordinates.

Feature-based image registration methods can be used when deformations are relatively large; on the other hand, non-parametric registration methods, such as the elastic and the fluid registration methods, are used when the deformation is small. Because of this, the feature-based registration is sometimes carried out as a pre-processing step that precedes the non-parametric registration.

Besides, the matching of spatial point sets is an important problem in various computer vision and pattern recognition areas such as motion tracking, shape matching, and industrial inspection. Often the captured signal is extracted to a spatial point set and the problem becomes detecting a geometric pattern from the point set. This may be accomplished by matching the extracted point set with a model point set.

The matching usually involves minimizing an energy function, that is, select from a set of candidate mappings a mapping that minimizes the energy function. Since the problem has received a lot of attention in the computer vision community, many different distance functions has been proposed. For example, the Hausdorff distance has been used by many authors to match two point clouds. Another widely used distance is the bottleneck distance, which is the maximum distance between any two matched points.

Given an energy function, sometimes an optimal mapping can be obtained, for example when the number of candidate mappings is small, then one can do an exhaustive search. Efficient optimization methods are applicable when the energy function is linear with linear constraints, or the energy function is quadratic. On the other hand, if the number of candidate mappings is large and the energy landscape is rough, that is, containing lots of local minima (or maxima), then sometimes the practice is to employ some heuristics. Examples of such heuristics are Simulated Annealing (SA), Generic Algorithm (GA), Tabu Search (TS), and the greedy algorithm. It is understood that heuristics usually are not guaranteed to generate the best solution for complex problems, hence most of the times the target is rather a solution that is hopefully close to the best one. In recent years, hybrid methods that combine two or more methods have been applied in different areas such as the designing of mobile networks and power systems. For example, a greedy simulated annealing algorithm combines a greedy local search method with SA to improve the convergence speed.

Underlying lots of existing methods for matching spatial point sets is the assumption that either it is the same set of objects that appear in both images and their spatial arrangements are by and large the same (e.g. medical images, static images of landscape, buildings, mountains), and noises, which may come from occlusions, distortions, or relative motions, are relatively small. In some situations such assumption is valid, but new method need to be developed in less ideal situations. For example, when a template image presents two cars and a reference image has only one, when objects undergo relative motions, or when objects are partially occluded in a reference image while it is fully revealed in a template image.

In medical imaging literatures, matching of point sets usually precedes finer registration techniques which establishes pixel-level correspondence. The matching of point sets is usually carried out by a least square regression or its variations, based on the assumption that there exists a global affine transformation. For example, in Seetharaman (2000), the global affine transformation is estimated by using a scatter matrix, which measures how the point sets as a whole are distributed in space; then local points are matched with a nearest-neighbor technique. In an iterative scheme, for example in the Block matching method in Ourselin (2001), the regression step could be repeated multiple times. In image alignment, for example in "Distinctive Image Features from Scale-Invariant Keypoints" by Lowe (Int. J. Comput. Vision 60(2): 91-110, 2004), candidates are first identified by comparing features, then a least square problem is solved to extract the parameters of an affine-transformation, again based on the assumption that most candidates more or less comply with a global affine transformation.

Xiong et al (2004) use a control network of super points, the disclosed embodiment is not scale invariant. Hahlweg (2003) discloses a method that uses transformation equations, whose parameters measure similarities between point sets. The method is affine-invariant if the transformation equation is carefully chosen. Finally, Kraft (2008) computes a force field that perturbs one point set to align with the other. Instead of worrying about the mappings between individual points, another school looks into minimizing the Hausdorff distances between point clouds. Implementations of this approach can be found in "Efficient Visual Recognition Using the Hausdorff Distance" by Rucklidge (Springer-Verlag New York, Inc., 1996) and "Comparing point clouds" by Mémoli (Proceedings of the 2004 Eurographics/ACM SIGGRAPH symposium on Geometry processing. Nice, France, ACM: 32-40).

In Yang and Keyes (2008), an affine energy model for matching point sets using SA is presented. There, a smoothness constraint is defined in terms of the Euclidean distance between the elements of the matrices of two affine transformations, where the energy function depends only on the location information of the points. SA is applied to solve the registration problem by iteratively removing and inserting cross-edges. Its potential in avoiding local minima in the presence of global affine and nonlinear transformations is demonstrated by comparing it with non-parametric registration and affine registration models. Timothy (2011) also uses the Euclidean distance to compare affine transformations for the purpose of image registration. But since an affine transformation is a mixture of rotation, scaling, displacement and shearing, which are mingled together in the elements of an affine transformation matrix, the significant elements of the matrix do not have much physical meaning, Euclidean distance between affine transformation matrices does not necessarily accurately reflect the similarities between the affine transformations.

SUMMARY

The present application addresses evaluating a mapping between two spatial point sets. It can be used as a post-processing unit for evaluating mappings generated by algorithms that match point sets, or work together with an optimization unit to match two point sets.

In one embodiment a spatial agent is a line-segment-of-action and computing a local distance measure involves computing the area of the parallelogram spanned by the transformed line-segment-of-actions. In another embodiment a spatial agent is a point-of-action and computing a local distance measure involves computing the distance between the two transformed point-of-actions. In yet another embodiment a spatial agent is a line-segments-of-action, and computing a local distance measure involves comparing the angles made by the transformed line segments and the ratio between the lengths of the transformed line segments. In yet another embodiment a spatial agent is a points-of-action. In yet another embodiment the spatial agent is a basis-of-action.

An embodiment describes a process for evaluating a mapping between two spatial point sets, the process comprises using a triangulation unit to generate pairs of neighbor (n+1)-combinations. Another embodiment describes a process for matching two spatial point sets using Simulated Annealing. Yet another embodiment describes a process for evaluating a mapping between two spatial point sets using a basis-of-action.

Embodiments describe a method for evaluating a mapping between two spatial point sets that involves receiving a first and a second spatial point sets and a one-to-one mapping between the two spatial point sets; defining a spatial agent; generating multiple mapped (n+1)-combinations in the first point set; computing multiple affine transformations that transform the multiple mapped (n+1)-combinations to correspondents in the second point set; applying the multiple affine transformations to the spatial agent to generate multiple transformed spatial agents; and computing a distance measure based on the multiple transformed spatial agents. It may involve computing an energy score based on one or more distance measures. It may further involve triangulating the first point set to obtain a triangulation.

Embodiments describe a system for evaluating a mapping between two spatial point sets that comprises a programmable processor and a memory coupled with the programmable processor and embodying information indicative of instructions that cause the programmable processor to perform operations comprising receiving a first and a second spatial point sets and a one-to-one mapping between the two spatial point sets; defining a spatial agent; generating multiple mapped (n+1)-combinations in the first point set; computing multiple affine transformations that transform the multiple mapped (n+1)-combinations to correspondents in the second point set; applying the multiple affine transformations to the spatial agent to generate multiple transformed spatial agents; and computing a distance measure based on the multiple transformed spatial agents. The operations may involve triangulating the first point set to obtain a triangulation. The operations may further involve computing an energy score based on one or more distance measures.

Embodiments describe a computer readable storage medium tangibly embodying a computer readable program code having computer readable instructions which when implemented, cause a computer to carry out the steps of a method for evaluating a mapping between two spatial point sets, the steps comprises receiving a first and a second spatial point sets and a one-to-one mapping between the two spatial point sets; defining a spatial agent; generating multiple mapped (n+1)-combinations in the first point set; computing multiple affine transformations that transform the multiple mapped (n+1)-combinations to correspondents in the second point set; applying the multiple affine transformations to the spatial agent to generate multiple transformed spatial agents; and computing a distance measure based on the multiple transformed spatial agents. The steps may involve triangulating the first point set to obtain a triangulation.

Embodiments describe a computer software system having a set of instruction for controlling a general purpose digital computer in evaluating a one-to-one mapping between a first spatial point set and a second spatial point set in nD, the computer software system comprising a set of instructions formed into multiple units, comprising a spatial agent definition unit configured to define a spatial agent; a combination selection unit configured to generate multiple mapped (n+1)-combinations from the first point set; an affine calculation unit configured to compute multiple affine transformations that transform the multiple mapped (n+1)-combinations to correspondents in the second point set; an affine transformation unit configured to apply the multiple affine transformations to the spatial agent to generate multiple transformed spatial agents; and a distance computation unit configured to compute a distance measure based on the multiple transformed spatial agents. The units may comprise a triangulation unit configured to generate a triangulation for the first point set.

Embodiments describe a system for evaluating a one-to-one mapping between a first spatial point set and a second spatial point set in nD, the system comprising means for receiving a first and a second spatial point sets and a one-to-one mapping between the two spatial point sets, means for defining a spatial agent, means for generating multiple mapped (n+1)-combinations in the first point set, means for computing multiple affine transformations that transform the multiple mapped (n+1)-combinations to correspondents in the second point set, means for applying the multiple affine transformations to the spatial agent to generate multiple transformed spatial agents; and means for computing a distance measure based on the multiple transformed spatial agents. The system may further comprise means for triangulating the first point set to obtain a triangulation.

DRAWINGS

Figures

DETAILED DESCRIPTION-FIRST EMBODIMENT

The affine transformation in nD is a line-preserving transformation from $R^n$ to $R^n$ that preserves parallelism and division-ratio. An affine transformation T acting on a point whose coordinate vector is $\vec{x}=[x_1,\ldots,x_n]^T \in R^n$ is denoted by $T(\vec{x})$, that can either be written in matrix form as $$A(T)\vec{x}+\vec{t}(T)$$

where A(T) is an n-by-n matrix and T(T) is an n-by-1 vector, both uniquely determined by T, or represented as a simple matrix-vector multiplication in homogeneous coordinates as:

$$\begin{bmatrix} A(T) & \vec{t}(T) \\ 0 & 1 \end{bmatrix} \begin{bmatrix} x_1 \\ \vdots \\ x_n \\ 1 \end{bmatrix}$$

In practice in homogeneous coordinates a point is usually represented in its standard form, which means that its element corresponding to the extra dimension obtained by embedding into a projective space is one; however, it is understood that in homogeneous coordinates two vectors are viewed as equal if one can be obtained by multiplying the other by a non-zero scalar.

In this invention, it is to be understood that a spatial point is a point of interest in nD, n=2, 3 extracted from a digital image using feature extractors (e.g. SIFT, Canny detector, and various corner or blob detectors), inserted into the space (by assigning coordinates to the point) of the digital image by a human operator through a computer user interface, or inserted into the space of the digital image by a computer algorithm. To each received spatial point there is in the input at least its coordinates, which is denoted by $loc(x_i)$ for a spatial point labeled by x. Whether loc(•) is in homogeneous or inhomogeneous coordinates depends on the context. Digital images comprise images suitable to be processed and displayed by a computer and acquired by various acquiring devices such as medical imaging machines, digital cameras, or any other divides that converts physical signals into images reflecting the spatial distribution of the physical signals, such as the MRI machine, which uses a powerful magnetic field to produce greyscale images, or the infrared camera which generates images based on infrared radiations.

For an affine transformation T, we will refer to A(T) as the left sub-matrix of T, and $\vec{t}(T)$ as the displacement component of T. An affine transformation is said to be nD if the dimension of the associated space is $R^n$. The representation of an nD affine transformation in homogeneous coordinates is an (n+1)-by-(n+1) matrix. We use $T(\vec{x})$ to denote the image obtained by applying an affine transformation T to a point $\vec{x}$, and $A(T)(\vec{x})$ to denote the image obtained by applying the left sub-matrix of T to $\vec{x}$. Similarly, if s is a set, then T(s) is used to denote the set obtained by applying the affine transformation T to each point of the set, and A(T)(s) denotes the set obtained by applying the left sub-matrix of T to each point of the set s.

Figure 1:
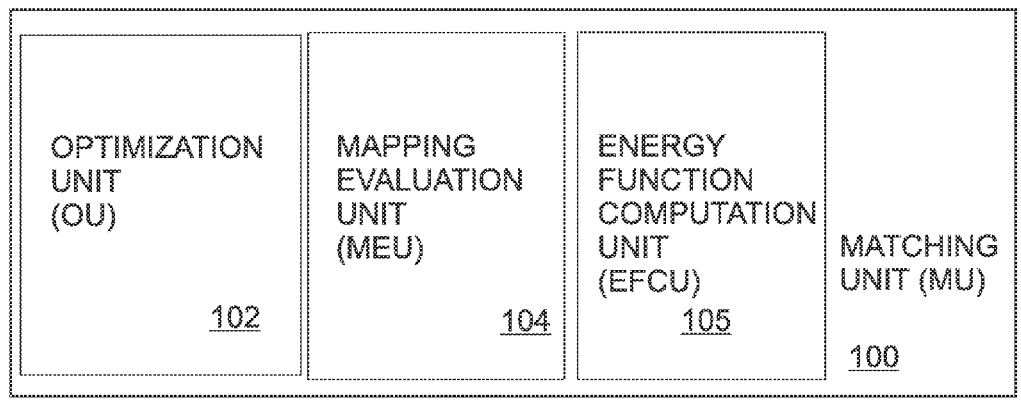
FIG. 1 is a block diagram of an illustrative embodiment of a matching unit.

FIG. 1 is a block diagram of an exemplary embodiment of a matching unit (MU) 100. As shown in FIG. 1, MU 100 includes an optimization unit (OU) 102, a mapping evaluation unit (MEU) 104, and an energy function computation unit (EFCU) 105.

In block 102, OU 102 receives two spatial point sets in nD, then generates a multiple of one-to-one mappings between the two point sets. To fix notation, we call one of the two spatial point sets the template point set $V_1$, and the other the reference point set $V_2$. In this embodiment, already one point set is designated as the template point set and the other is designated the reference point set. Alternatively, OU 102 can be configured to arbitrarily chose one point set as the template point set and the other as the reference point set.

In this document, a one-to-one mapping is a correspondence between two point sets such that for each point in one point set there is at most one corresponding point in the other. The domain of the one-to-one mapping is a subset of the first point set. A point of the template point set, which we will call a template point, is either an isolated point, or is associated with a unique point in the reference point set, in which case we say there is an cross-edge between the template point and the reference point. The same applies to a point of the reference point set, which we will call a reference point. A one-to-one mapping between two point sets in $R^n$ can also be represented as a displacement field, where to each point of a subset of the first point set there is attached a displacement vector, such that the point's correspondent's location can be calculated by adding the displacement vector to the point's location. A point in either point set that has no correspondent is called an isolated point. Also, two point sets together with a one-to-one mapping between them is referred to as a configuration. A sub-configuration is a configuration that contains a subset of the points and the correspondences of an original configuration. "A pair of corresponding points" is used to refer to two points that are correspondents of each other.

An energy function (a.k.a. cost function, distance measure, similarity measure, fitness measure) associate each configuration with a score in R. If the configuration is a sub-configuration, the scalar is referred to as a local energy score, otherwise the scalar will be referred to as an overall energy score. A local (resp:global) energy score comprises one or more local (resp:global) distance measures (defined below) and zero or more additional terms (i.e., not computed from transformed spatial agents). Hereinafter, E(•) will be used to denote an energy function. An energy function is often used to evaluate the desirability of a configuration. In this embodiment we assume that lower energy scores are more desirable; on the other hand, if higher energy scores are more desirable, one can simply flip the sign of the energy function.

Figure 3:
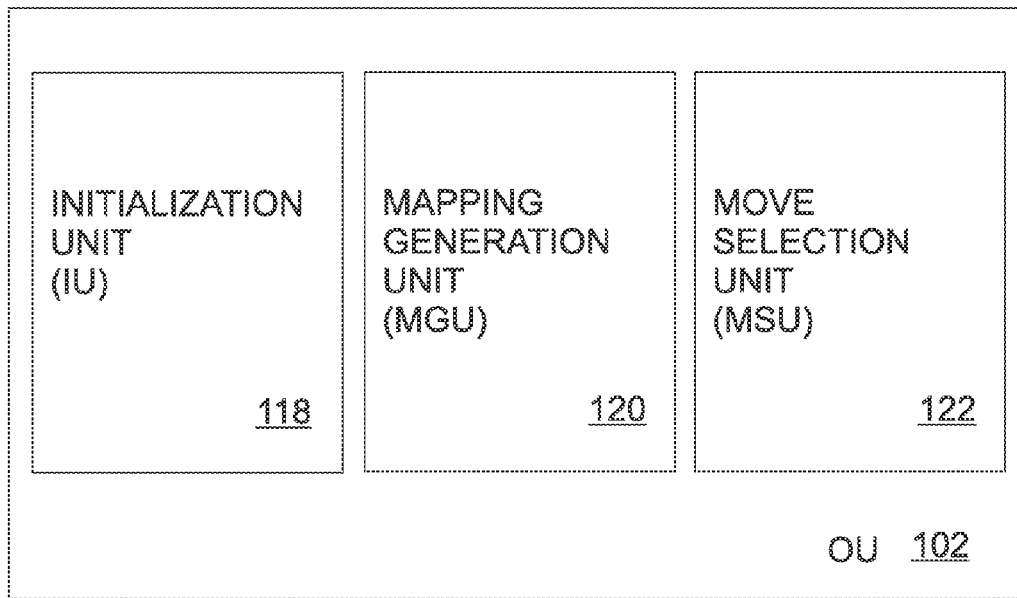
FIG. 3 is a block diagram of an illustrative embodiment of an optimization unit shown in FIG. 1.

FIG. 3 is a block diagram of an illustrative embodiment of the OU 102 shown in FIG. 1. As shown in FIG. 3, OU 102 comprises an initialization unit (IU) 118, a mapping generation unit (MGU) 120, and a move selection unit (MSU) 122. Upon receiving two point sets, OU 102 generates multiple candidate mappings between the two point sets, then select among the candidate mappings a mapping with the lowest energy score. Alternatively, it is possible to select more than one candidate mappings. Such examples can be found in multi-objective optimization.

In block 118, IU 118 generates a first generation containing one or more configurations. In block 120, MGU 120 generates one or more configurations using the current generation. In block 122, MSU 122 selects one or more configurations either from the newly generated configurations or from the union of the newly generated configurations and the individuals of the current generation. MSU 122 then update the current generation so that it consists of the selected configurations.

I contemplate that in this embodiment Simulated Annealing (SA) is used in OU 102 for iteratively generating multiple one-to-one mappings. The SA algorithm is listed below:

1. At IU 118, a random configuration is created to be the initial configuration by a random walk in the configuration space, and a starting temperature is chosen.
2. At the current temperature, MGU 120 performs a series of moves. For each move, MEU 104 and EFCU 105 evaluate the difference between two energy scores $\Delta E = E_2 - E_1$ (usually the difference can be computed by evaluating one or more sub-configurations instead of computing energy scores for $E_2$ and $E_1$), where $E_2$ is the energy score for the new configuration after the move and $E_1$ is the energy score for the original (current) configuration before the move. In MSU 122 each move is accepted or rejected according to a certain acceptance criterion. If a move is accepted, the current configuration is set to be the new configuration, otherwise no update is performed and the current configuration is still the original configuration.
3. OU 102 update the current temperature according to a schedule.
4. If the current temperature is lower than some end value (or if no moves has been accepted for a predetermined period of time), print a "good configuration" (a good configuration in our context is defined to be either the final configuration or the configuration with the lowest energy score so far) and end the algorithm; otherwise go back to step 2.

In the above embodiment, since only one random walker is involved, each generation contains only one configuration. Alternatively, in ensemble based simulated annealing, or in some parallel simulated annealings where discovered information are exchanged regularly, each generation may contain multiple configurations.

At IU 118, I contemplate that in this embodiment, the initial configuration is created by performing a random walk (i.e. every move is accepted) in the space of configurations and record the last configuration as the initial configuration. Alternatively, an initial configuration can be created in various ways. In one embodiment an initial configuration is a configuration where every point is isolated, in another embodiment an initial configuration is created by select randomly for each template point a reference point from the bag of reference points, where the bag of reference points contains all points in the reference point set plus a null point, where a template point is mapped to a null point if and only if the template point is an isolated point. The selection is without replacement if the selected reference point is not the null point, and with replacement otherwise.

I contemplate that in this embodiment, the initial temperature is set to 10 max|ΔE|, where max|ΔE| is obtained by recording the maximum energy difference maxΔE in a random walk in the space of configurations. Alternatively, an initial temperature can be determined in various ways. For example, the initial temperature can be set to the max energy score max|E| occurred during a random walk, the mean of all energy scores measured during a random walk, or simply a predetermined value.

In OU 102, I contemplate that in this embodiment, the cooling schedule is constructed so that the current temperature is updated according to $T_{current} = T_{current} * f$, where f is a cooling factor usually in the range of [0.8, 0.999]. Alternatively, there are various cooling schedules. In one embodiment, $T_{current} = a - b * T_{current}$, where a is the initial temperature, and b is a decrement factor chosen in the interval [0.01; 0.2]. In another embodiment, a non-monotone cooling schedule, for example the bouncing approach introduced in "Bouncing towards the optimum: improving the results of Monte Carlo optimization algorithms" by Schneider, Morgenstern, and Singer (1998, Phys Rev. E 58, 5085), is used.

In MSU 122, I contemplate that in the current embodiment a move from a first configuration $c_1$ to a second configuration $c_2$ is accepted if $$r < e^{\frac{-\Delta E}{T}},$$

where $\Delta E = E(c_2) - E(c_1)$ is the difference in energy, T is the current temperature, and r is a uniformly distributed random variable in [0, 1]. This kind of acceptance criteria is what defines Simulated Annealing. Alternatively, for example, in one embodiment Threshold Accepting is implemented in OU 102, and the acceptance criterion is replaced by $\Delta E < \theta$, where θ is a threshold that is lowered gradually from a large value to 0.

To use simulated annealing (and other improvement heuristics), we need to define moves that generates one configuration from another. Once such moves are defined, if a configuration x can be reached from a configuration y in one move, we say x is a neighbor of y, denoted by $x \in N(y)$. Notice that $x \in N(y)$ doesn't necessarily mean $y \in N(x)$.

In MGU 120, I contemplate that in this embodiment the basic moves are "Cut"s and "Nit"s:

In a Cut step, an cross-edge of a configuration is chosen at random (i.e., according to a probability distribution), then the chosen cross-edge is removed. The new configuration has one cross-edge less than the original one.

In a Nit step, an isolated template point and an isolated reference point are chosen at random. A cross-edge between the two points is added. The new configuration has one cross-edge more than the original one.

Three further moves can be defined. In a moving class A, each move can be either a Cut or a Nit:

1. According to a probability distribution, choose either an existing cross-edge $e = (v_1, v_2)$, or an isolated point $v_3$ from $V_1$ and an isolated point $v_4$ from $V_2$. If a cross-edge is chosen, go to step 2. Otherwise go to step 3.
2. Cut e. End.
3. Nit a cross-edge $(v_3, v_4)$. End.

With moving class B, more than one Cuts can occur in a single move. At each step we randomly choose a point $(v_1, v_2)$ from $V_1 \times V_2$, the Cartesian product of these two point sets, then:

1. If $(v_1, v_2)$ is already connected by a cross-edge, disconnect it and End. Otherwise go to step 2.
2. If $v_1$ is connected to another point $v'_2$, $v'_2 \neq v_2$, Cut $(v_1, v'_2)$. Similarly if $v_2$ is connected to a point $v'_1 \neq v_1$, Cut $(v'_1, v_2)$. Go to step 3.
3. Nit $v_1$ and $v_2$. End.

In a moving class C, a move can include a Cut and a Nit, but not two Cuts. Let N be the set of isolated reference points. First a template point is chosen at random. If the chosen template point is a mapped point, then either a reference point from N is chosen (without replacement) to replace the correspondent of the chosen template point, the correspondent is put back into N, or the cross-edge is removed. The former case involves a Cut and a Nit while the latter involves only a Cut. A random number generator is used to choose between the two cases.

Besides what is described above, Simulated Annealing has many variations, and some parameters has to be tuned. See chapter one of "handbook of metahuristics" (Gendreau, Michel and Potvin, Jean-Yves, 2010, Springer, New York) for a summary.

Alternatively, the greedy algorithm can be use:
1. At IU 118, a random configuration is created to be the initial configuration by a random walk in the configuration space.
2. MGU 120 generates all neighbors of the current configuration.
3. Does the current configuration have better neighbors (i.e., a neighbor configuration with a lower energy score) ?If yes, go to step 4, otherwise go to step 5.
4. MSU 122 selects the best neighbor and updates the current configuration with the best neighbor. Go back to step 2.
5. Print the current configuration, End.

Sometimes the whole process is repeated multiple times for a multiple of random initial configurations, and the multiple results are compared to obtain the best result.

Alternatively, one can select the first better neighbor instead of the best neighbor:
1. At IU 118, a random configuration is created to be the initial configuration by a random walking in the configuration space.
2. MGU 120 generates a first neighbor for the current configuration and set it as the current neighbor.
3. MSU 122 accepts the current neighbor and go back to step 2 if the current neighbor is better than the current configuration, otherwise go to step 4.
4. If the current configuration has unprocessed neighbors, MGU 120 generates the next neighbor for the current configuration and set it as the current neighbor, go to step 3; otherwise print the current configuration and End.

Various other heuristics, such as Tabu Search (TS), Genetic Algorithm (GA), and the great deluge algorithm (GDA) can be applied. Hybrid algorithms such as greedy simulated annealing, genetic simulated annealing are also applicable.

Figure 2:
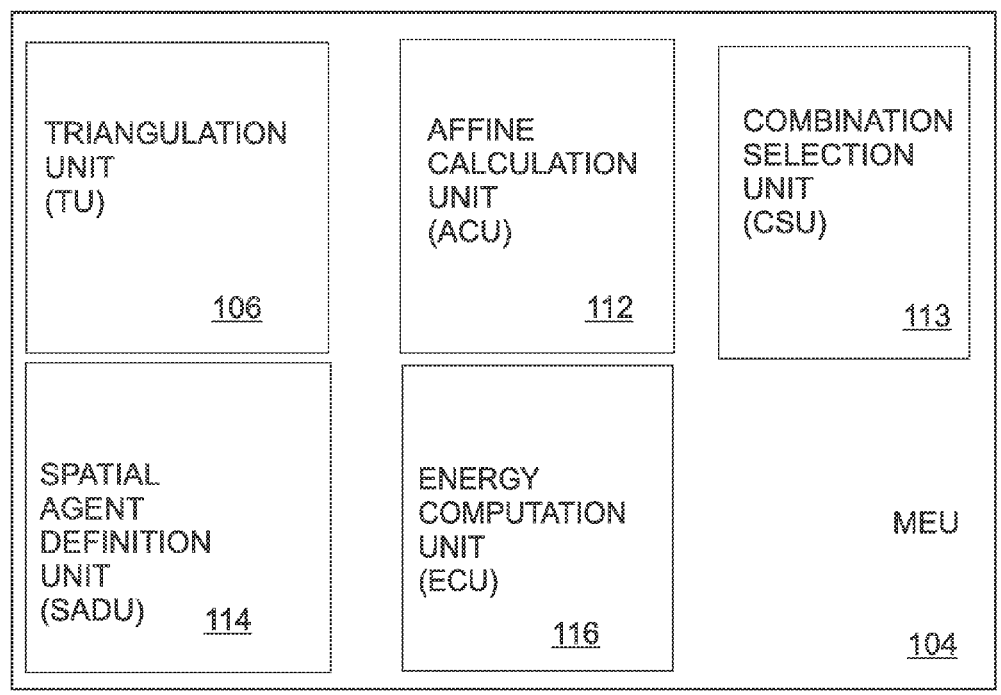
FIG. 2 is a block diagram of an illustrative embodiment of a matching evaluation unit shown in FIG. 1.

FIG. 2 is a block diagram of an exemplary embodiment of MEU 104 shown in FIG. 1. As shown in FIG. 2, MEU 104 includes a triangulation unit (TU) 106, an affine calculation unit (ACU) 112, a combination selection unit (CSU) 113, a spatial agent definition unit (SADU) 114, and an energy computation unit (ECU) 116. MEU 104 receives as input at least a configuration or a sub-configuration comprising a first spatial point set (template point set), a second spatial point set (reference point set), and a one-to-one mapping between the two point sets. At output, it calculates one or more local or overall distance measures.

As illustrated in FIG. 1, MEU 104 may be configured to work with OU 102 so that mappings are generated by OU 102. For a given configuration or sub-configuration, MEU 104 computes respectively one or more overall or local distance measures.

In nD, an (n+1)-combination of a point set is a subset of the point set containing n+1 distinct points. An (n+1)-combination can define a simplex in nD if the points are in general position. For example, in 2D, three non-collinear points define a triangle, and in 3D, four non-coplanar points define a tetrahedron. If two (n+1)-combinations have n points in common and the interiors of the two corresponding simplices do not overlap, then we say that they are neighbors. Obviously a pair of neighbor (n+1)-combinations contains exactly n+2 unique vertices altogether. A point of a pair of neighbor (n+1)-combinations can refer to any member point of either (n+1)-combination. The intersection of a pair of (n+1)-combinations refers to the set of points belonging to both (n+1)-combinations. In 2D, two 3-combinations having 2 points in common means the corresponding triangles share a common edge, which we will refer to as the common edge of the two neighbor 3-combinations. Similarly, in 3D, two 4-combinations having 3 points in common means the corresponding tetrahedron share a common triangle, which we will refer to as the common triangle of the two neighbor 4-combinations. A mapped (n+1)-combination is an (n+1)-combination that contains n+1 non-isolated points. The correspondent of a mapped (n+1)-combination is defined to be the set consisting of the correspondents of each member of the (n+1)-combination.

We will use "common line" to refer to the line passing through a common edge (of a pair of neighbor 3-combinations) in 2D, and "common surface" to refer to the surface passing through a common triangle (of a pair of neighbor 4-combinations)) in 3D. Moreover, "common hyperplane" is refers to either a common edge or a common triangle depending on the context.

MEU 104 can be used as a post-processing unit for evaluating mappings generated by algorithms that match point sets. Doing so, MEU 104 may generate physical outputs, for example an energy score display in an UI at the discretion of a human operator or a printed document.

MEU 104 can also be configured to work together with OU 102 to select a good mapping among a set of candidate mappings. MEU 104 can be configured to work with an energy function computation unit (EFCU) 105 so that the local or overall distance measures computed by MEU 104 are integrated into a local or overall energy score computed by EFCU 105. In this scenario, MEU 104 generate software outputs that serve as inputs to other software applications, programs, or modules, the output can be passed among modules and processes using various methods such as function calls, sockets, files, calling protocols such as SOAP and DCOM, and combinations thereof.

In combination, MEU 104 and EFCU 105 may either be configured to work together with OU 102 to select a good mapping among a set of candidate mappings, or be used as a post-processing unit for evaluating mappings generated by algorithms that match point sets.

In this embodiment, (n+1)-combinations are provided by triangulating the template point set. In block 106, TU 106 triangulates the template point set to obtain a triangulation, which we will call a template triangulation. In 2D, a template triangulation defines a set of triangles, which we call template triangles. In 3D it defines a set of tetrahedra, which we call a template tetrahedra. In general, a triangulation of a point set in nD divides the convex hull of the points into nD simplices. For example, a triangulation of a point set in 2D divides the convex hull of the points into triangles; a triangulation in 3D divides the convex hull of the points into tetrahedra.

We say that a template triangle (resp: tetrahedron) is a mapped triangle (resp: tetrahedron) whenever all of its vertices have correspondents, or equivalently the 3-combination (resp: 4-combination) of its vertices is mapped.

I contemplate that in this embodiment Delaunay triangulation is used, which in MATLAB® is provided by the function "delaunay". (MATLAB is a premier technical computing environment that is developed by MathWorks Inc., Natick, Mass., United States.) Delaunay triangulations are optimal in the sense of the MaxMin angle criterion and tend to avoid skinny triangles. There are various algorithms for computing Delaunay triangulations, e.g., the radial sweep algorithm, the incremental algorithm, and the divide-and-conquer algorithm. There are other triangulations based on other optimal criteria. For example, in minimum weight triangulation, the criterion is to minimize the total edge weights. There are also many triangulation software packages for different languages: in MATLAB® 2D Delaunay triangulations are generated by the function "delaunay" and the function "delaunayn" computes Delaunay triangulations for a set of points in higher dimensions, in addition the software package "Triangle" by Prof. Jonathan Richard Shewchuk at UC Berkley, and the Computational Geometry Algorithms Library (CGAL).

In this document, in 2D, a 3-combination, for example a 3-combination containing the vertices of a triangle, is often denoted by a tuple. For example, a 3-combination denoted by $(i_1, i_2, i_3)$ contains three distinct points $i_1, i_2, i_3$. Similarly, in 3D a tuple containing four points denotes a 4-combination, which for example could contain the vertices of a tetrahedron. A line segment is often denoted by a pair of end points. For example, $(p_1, p_2)$ represents a line segment whose two end points are $p_1$ and $p_2$.

In block 113, CSU 113 generates one or more sets of (n+1)-combinations in $V_1$. If more than one set of (n+1)-combinations are generated, an (n+1)-combination can appear in multiple sets. In this embodiment, I contemplate that in 2D each set consists of a pair of neighbor mapped 3-combinations, where each 3-combination contains the vertices of a template triangle, and the two template triangles share a common edge. In 3D each set consists of a pair of neighbor mapped 4-combinations, where each 4-combination contains the vertices of a template tetrahedron, and the two template tetrahedra share a common triangle. Whenever a pair of neighbor (n+1)-combinations satisfy the above condition, i.e., each of the (n+1)-combination contains the vertices of a template simplex, and the two simplices share a common (n−1)D simplex, then we say that the pair of neighbor (n+1)-combinations is induced by the template triangulation. To find the pairs of neighbor mapped 3-combinations, we iterate through all internal edges of the template triangulation, and check for each internal edge whether both template triangles containing the edge are mapped. If the answer is yes, then CSU 113 generates a pair of neighbor mapped 3-combinations. A similar process applies in 3D.

For illustration purpose, for a configuration and its template triangulation, a dynamic triangulation can be created by the following process: if two points in the template point set are connected by an edge of the template triangulation (need to be differentiated from cross-edges, which are between different point sets), and none of the two points is isolated, then we add a new edge between their correspondents in the reference point set. We call this process of deriving a graph for a second point set from a graph of a first point set based on a one-to-one mapping between the two point sets a dynamic triangulation. The word "dynamic triangulation" is also used to refer to the obtained graph. In the second point set dynamic triangulations are used for illustration purpose only, they are not intended to be part of the invention.

Figure 5:
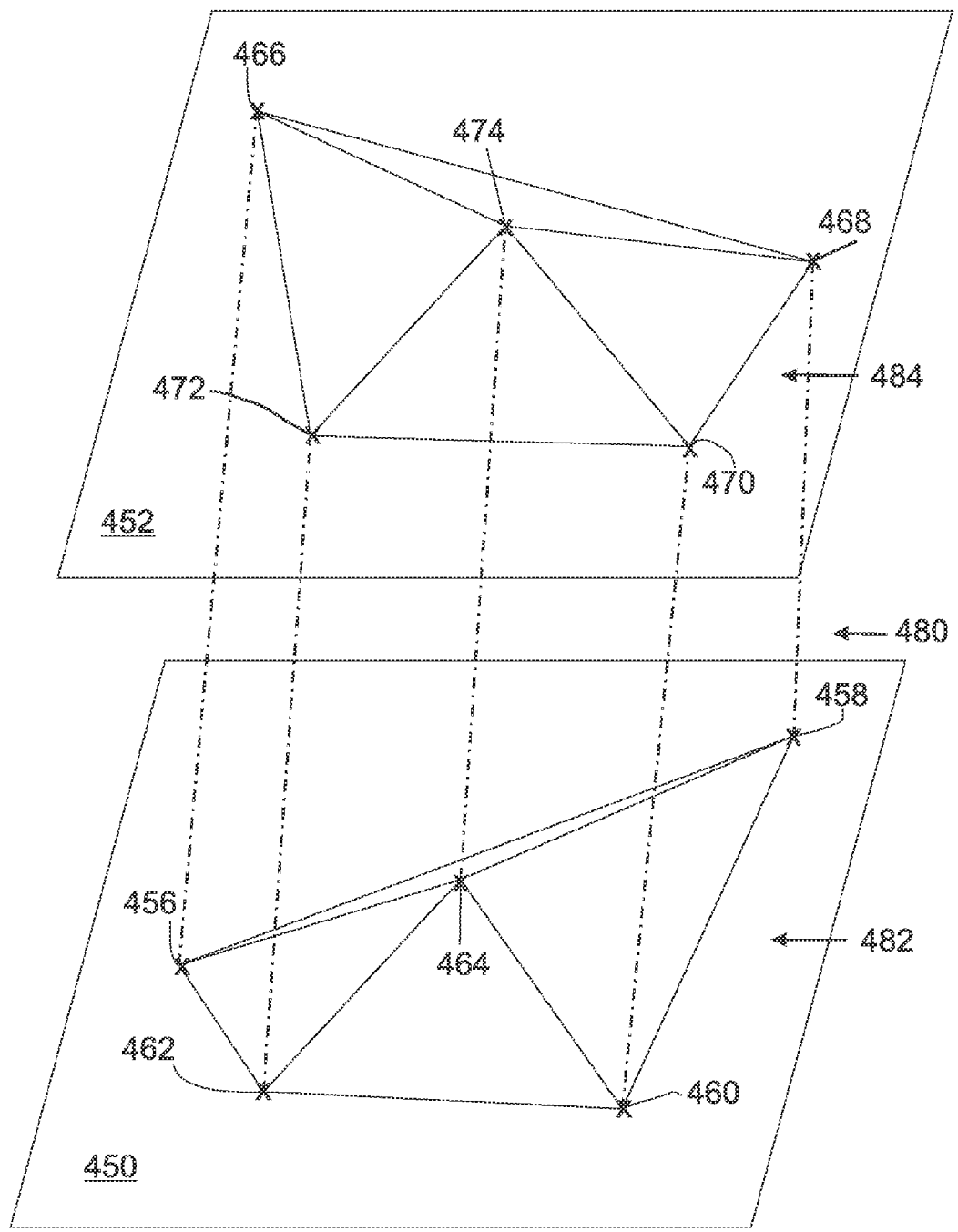
FIG. 5 is an exemplary illustration in 2D of a configuration, a template triangulation, and a dynamic triangulation.

For example, FIG. 5 illustrates a mapping 480 from a first point set 456, 458, 460, 462, 464 in a plane 450 respectively to a second point set 466, 468, 470, 472, 474 in a plane 452. After triangulating the first point set to obtain the triangulation 482, a dynamic triangulation 484 is created for the second point set.

Figure 6:
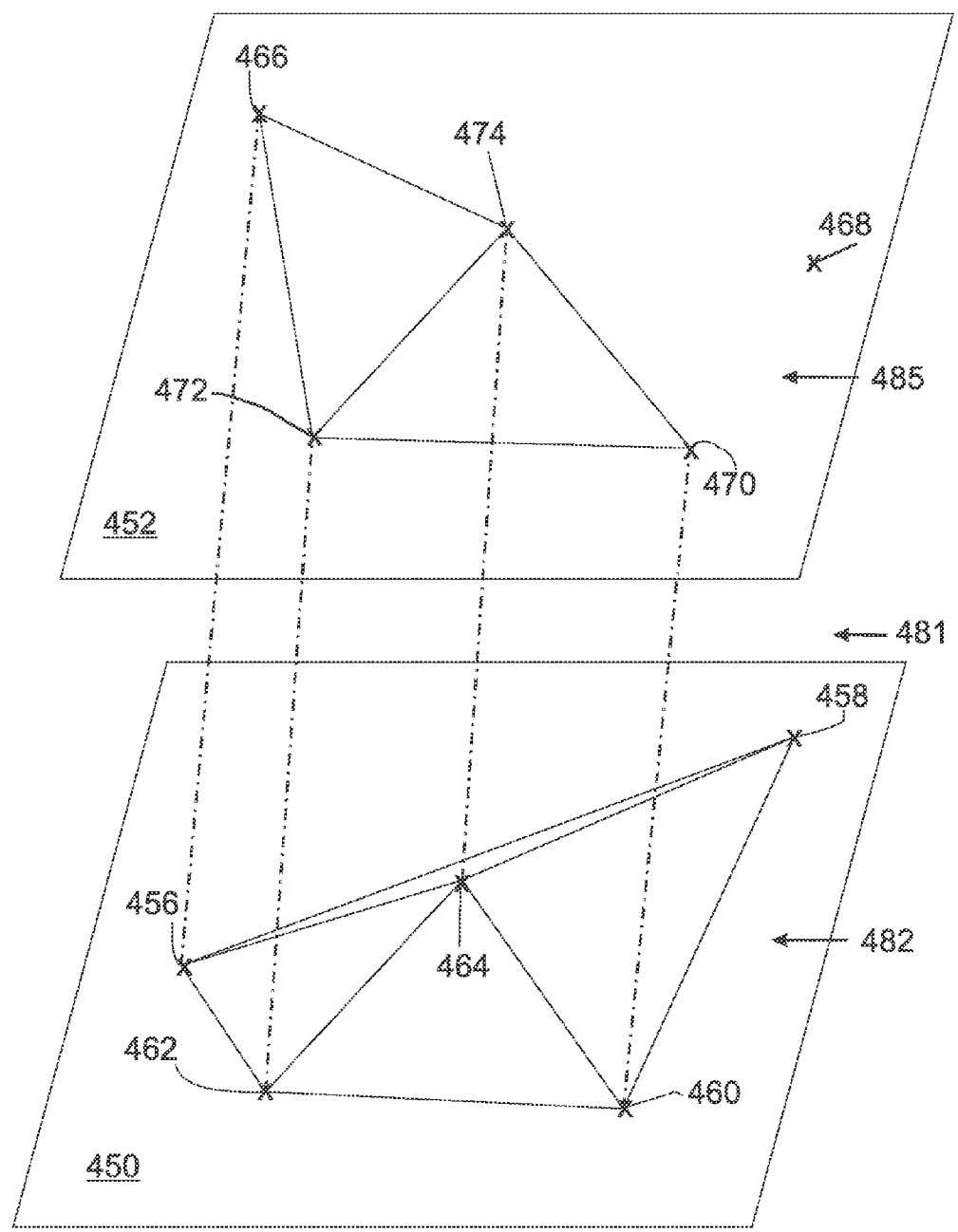
FIG. 6 is another exemplary illustration in 2D of a configuration, a template triangulation, and a dynamic triangulation.

FIG. 6 illustrates another mapping 481 from the points 456, 460, 462, 464 respectively to the points 466, 470, 472, 474. For the same triangulation 482, a dynamic triangulation 485 is created for the second point set, the dynamic triangulation does not involve the point 468 and any edge adjacent to it because the point 468 is not involved in the mapping 481. In general a dynamic triangulation can contain multiple components that are not connected, and each disconnected component can have zero or more triangles, zero or more stand-alone edges, where an edge is stand-alone if it is not a part of any triangle, or a combination of both. Similarly, in 3D, a dynamic triangulation can contain multiple disconnected components, each component can have zero or more tetrahedra, zero or more stand-alone triangles (i.e., not part of any tetrahedron), and zero or more stand-alone edges (i.e., not part of any triangle).

Alternatively, there are various ways to generate sets of (n+1)-combinations. For example, in one embodiment in 2D, each set consists of a pair of mapped 3-combinations having exactly 1 point in common. According to this criteria, as an illustrative example in FIG. 5, the two 3-combinations (462, 464, 460) and (456, 458, 464) can be paired up because they share a common point 464. In another embodiment in 2D, CSU 113 selects all pairs of mapped 3-combinations, so that $\binom{k}{2}$ pairs of 3-combinations are generated, where k is the total number of mapped 3-combinations.

Figure 7:
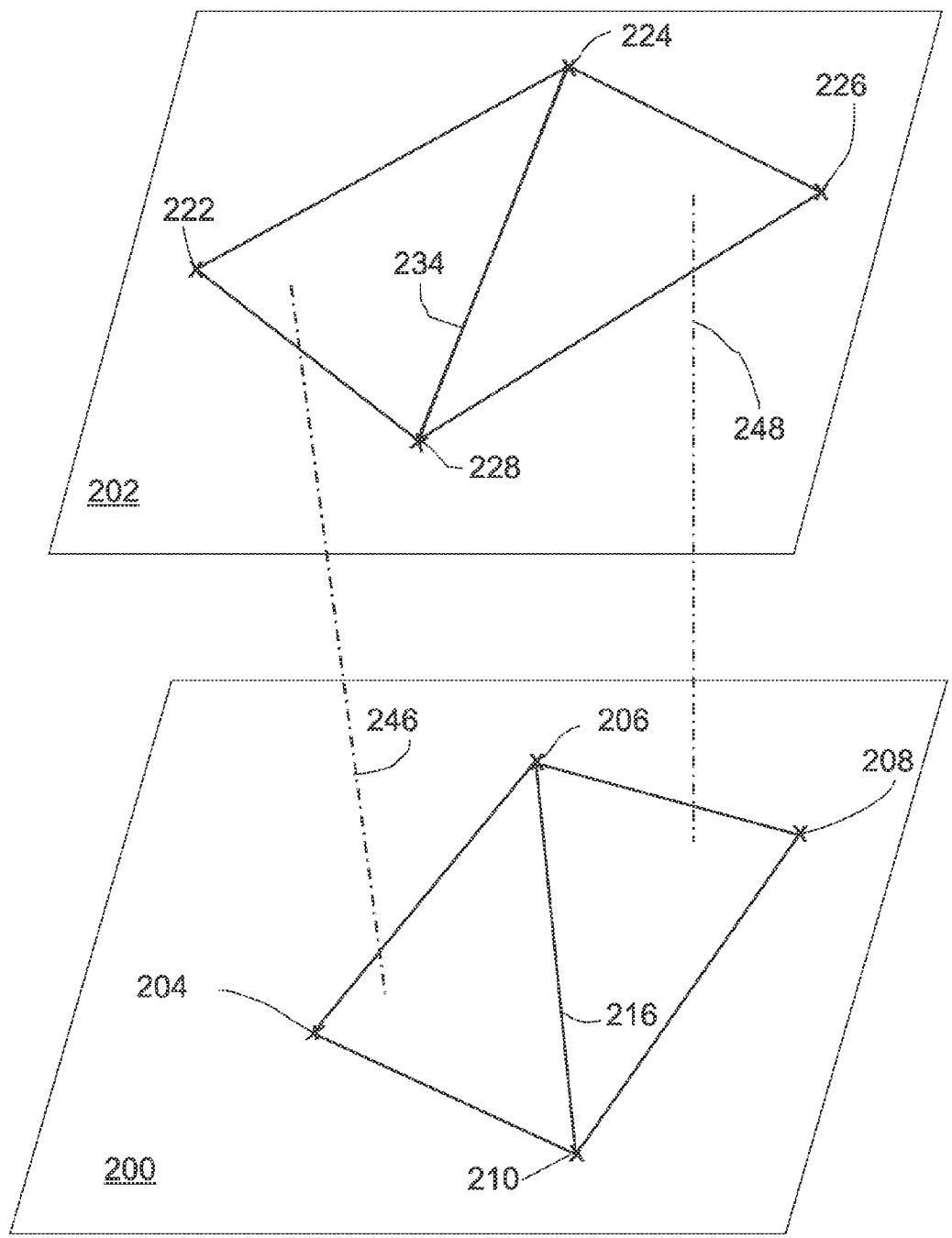
FIG. 7 is an exemplary illustration in 2D of two affine transformations generated from two neighbor 3-combinations.

In block 112, ACU 112 receives at least a mapped (n+1)-combination in $V_1$ and computes for it an affine transformation. Whenever an (n+1)-combination is mapped, and the points are in general position, an affine transformation is defined. The affine transformation is said to be generated from the mapped (n+1)-combination, and the (n+1)-combination is said to be associated with the affine transformation. Referring to FIG. 7, there is shown an exemplary illustration of two affine transformations 246 and 248 in 2D. The affine transformation 246 is defined by the mapping from points 204, 206, 210 in a plane 200 respectively to points 222, 224, 228 in a plane 202, (equivalently it maps a triangle/3-combination (204,206,210) to a triangle/3-combination (222,224, 228), plane 200 and plane 202 could be interpreted as either the same plane or different planes, depending on the application context.) Affine transformation 248 maps points 206, 208, 210 respectively to points 224, 226, 228.

We say that n, n≥2 affine transformations $T_1, T_2, \ldots, T_n$ agree on a point $\vec{p}$ if and only if they transform the point to the same point: $T_1(\vec{p})=T_2(\vec{p})=\ldots=T_n(\vec{p})$, and they agree on a set if and only if they agree on each point of the set. From the way affine transformations are generated, it is obvious that two affine transformations defined on two neighbor mapped (n+1) combinations agree on the intersection, the common hyperplane, and the affine hull of the intersection of the two (n+1)-combinations. In FIG. 7, the affine transformations 246 and 248 agree on a line segment 216, which both affine transformations transform to a line segment 234. In FIG. 5, the affine transformation that transforms points 456, 458, 464 to points 466, 468, 474 and the affine transformation that maps points 456, 464, 462 to points 466, 474, 472 agree on the line segment (456,464) by construction.

Figure 8:
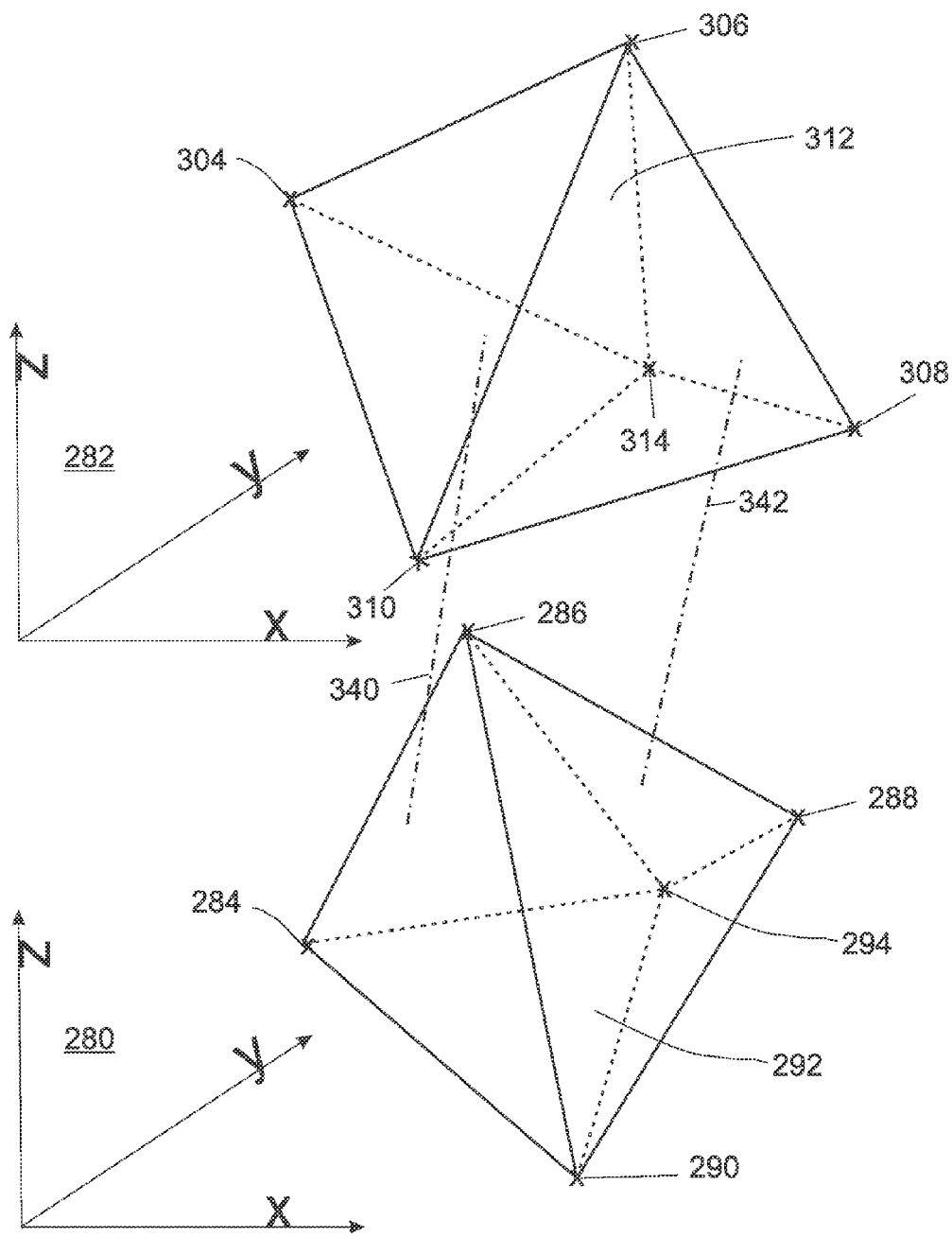
FIG. 8 is an exemplary illustration in 3D of two affine transformations generated from two neighbor 4-combinations.

The same holds in 3D. Whenever there is a mapped 4-combination, and the points are in general position, an affine transformation is defined. Referring to FIG. 8, there is shown an exemplary illustration of two affine transformations 340 and 342 in 3D. The affine transformation 340 is defined by the mapping between points 284, 286, 294, 290 in a space 280 and respectively the points 304, 306, 314, 310 in a space 282 (equivalently it maps tetrahedron/4-combination (284, 286, 294, 290) to tetrahedron/4-combination (304, 306, 314, 310)). The space 280 and the space 282 could either be the same space or different spaces (similar comments will be omitted hereafter). The affine transformation 342 maps points 286, 288, 290, 294 respectively to points 306, 308, 310, 314. The affine transformations agree on a triangle 292 (and the 3-combination (286,294,290)), which both affine transformations transform to a triangle 312.

Although both of the above examples shows merely two affine transformations, they are only provided as examples, we do not intend to limit the number of affine transformations that agree.

In this embodiment, I contemplate that in 2D affine transformations are computed by equation 1:

$$A=I+[u_1,u_2,u_3][loc(x_1),loc(x_2),loc(x_3)]^{-1} \quad (1)$$

Here A is a 3-by-3 affine transformation matrix to be computed, $x_1, x_2, x_3$ are members of a mapped 3-combination, $y_1, y_2, y_3$ are the respective correspondents, $u_i=loc(y_i)-loc(x_i)$, i=1, 2, 3 are the displacement vectors, and all coordinates are in homogeneous coordinates. As long as the three points $x_1, x_2, x_3$ are not collinear, we will obtain a full-ranked affine matrix A. The matrix A could represent the local affine motion within a triangle. One may easily extend Equation 1 to work in 3D. Also there are various ways to solve for A in equation 1: if the spatial dimension is small (like 2D or 3D), then existing formulas for matrix inversion can be used, where such formulas can be obtained by using matrix determinants and matrix cofactors; otherwise, methods such as Gauss-Jordan elimination, Gaussian elimination, or LU decomposition can be used to either invert $[loc(x_1), loc(x_2), loc(x_3)]$ or compute A directly by solving a linear system.

Alternatively, an affine transformation from $x_1, x_2, x_3$ to $y_1, y_2, y_3$ can be obtained by first computing an affine transformation that maps $y_1, y_2, y_3$ to $x_1, x_2, x_3$, then invert the transformation matrix.

There are alternative methods to compute the affine transformation. For example, in one embodiment, the Direct Linear Transformation (DLT) algorithm in the book 'Multiple View Geometry in Computer Visio' by Hartley and Zisserman (2003, Cambridge University Press, 2nd edition, Chapter 4) is employed. Notice that while four template points and four corresponding reference points (in general position) are needed to compute a projective transformation in 2D, only three template points and three corresponding reference points (in general position) are needed for an affine transformation.

Alternatively, in nD it is possible to generate an affine transformations from more than (n+1) non-isolated template points by solving an over determined system using pseudo inverse. One can also use projective transformations instead of affine transformations. Most embodiments in this invention can be adapted to work with these two alternatives with minor modifications. For one example, CSU 113 generates (n+k)-combinations, k>2, and ACU 112 computes affine transformations by pseudo inverse. For a second example, CSU 113 generates (n+k)-combinations, k>2, ACU 112 computes projective transformations by the DLT algorithm, and ECU 116 transform spatial agents by projective transformations instead of affine transformations to get transformed spatial agents. We will not discuss further in this direction.

In block 114, SADU 114 receives at least one set of (n+1)-combinations generated by CSU 113, then defines for the set at least one spatial agent. For a set of (n+1)-combinations in nD, a spatial agent is a collection of one or more points that in combination represents one or more geometric objects; an affine transformation generated from any mapped member of the set of (n+1)-combinations can act on the spatial agent to generate a new spatial agent, which we call a transformed or derived spatial agent.

In general, defining a spatial agent involves:
  identifying one or more input spatial points as a spatial agent; or
  generating new spatial points other than those already in the input to form a spatial agent; or
  combination thereof.

In this embodiment, since each set that SADU 114 receives is a pair of neighbor (n+1)-combinations, I contemplate that in 2D SADU 114 defines for each pair of neighbor 3-combinations a spatial agent, the spatial agent consists of two end points of a line segment perpendicular to the common edge, where one of the end points is contained in the common edge and the other is not. We call this line segment a line-segment-of-action. (In general, this is the format we will use to refer to a specific spatial agent, with the part before "-of-action" being the geometric object(s) represented by the spatial agent. For example, if a spatial agent consists of two line segments, then it'll be referred to as a line-segments-of-action. On the other hand, if we have two spatial agents, each of which is a line-segment-of-action, then we say there are two line-segment-of-actions.)

In more detail, in 2D for a pair of neighbor 3-combinations with common edge H, we arbitrarily choose a point $\vec{p} \in H$ (or the affine hull of H) as the first end point, a second end point is computed by $\vec{p}+\vec{v}$, where $\vec{v}$ is a unit vector orthogonal to the common edge. To compute $\vec{v}$, let $\vec{h}=[h_1, h_2]$ be any vector in the direction of H, in this embodiment $\vec{v}$ is computed as $$\frac{[h_2, -h_1]}{\sqrt{h_1^2 + h_2^2}}$$

A line-segment-of-action l perpendicular to the common edge is defined by the two end points $\vec{p}$ and $\vec{p}+\vec{v}$.

In 3D, a similar procedure applies by replacing "common edge" with "common triangle", and to compute $\vec{v}$ for an H containing three points $\vec{h}_1, \vec{h}_2, \vec{h}_3$, one can computer the cross product of any two vectors of $\vec{h}_1-\vec{h}_2, \vec{h}_1-\vec{h}_3, \vec{h}_2-\vec{h}_3$.

Figure 9:
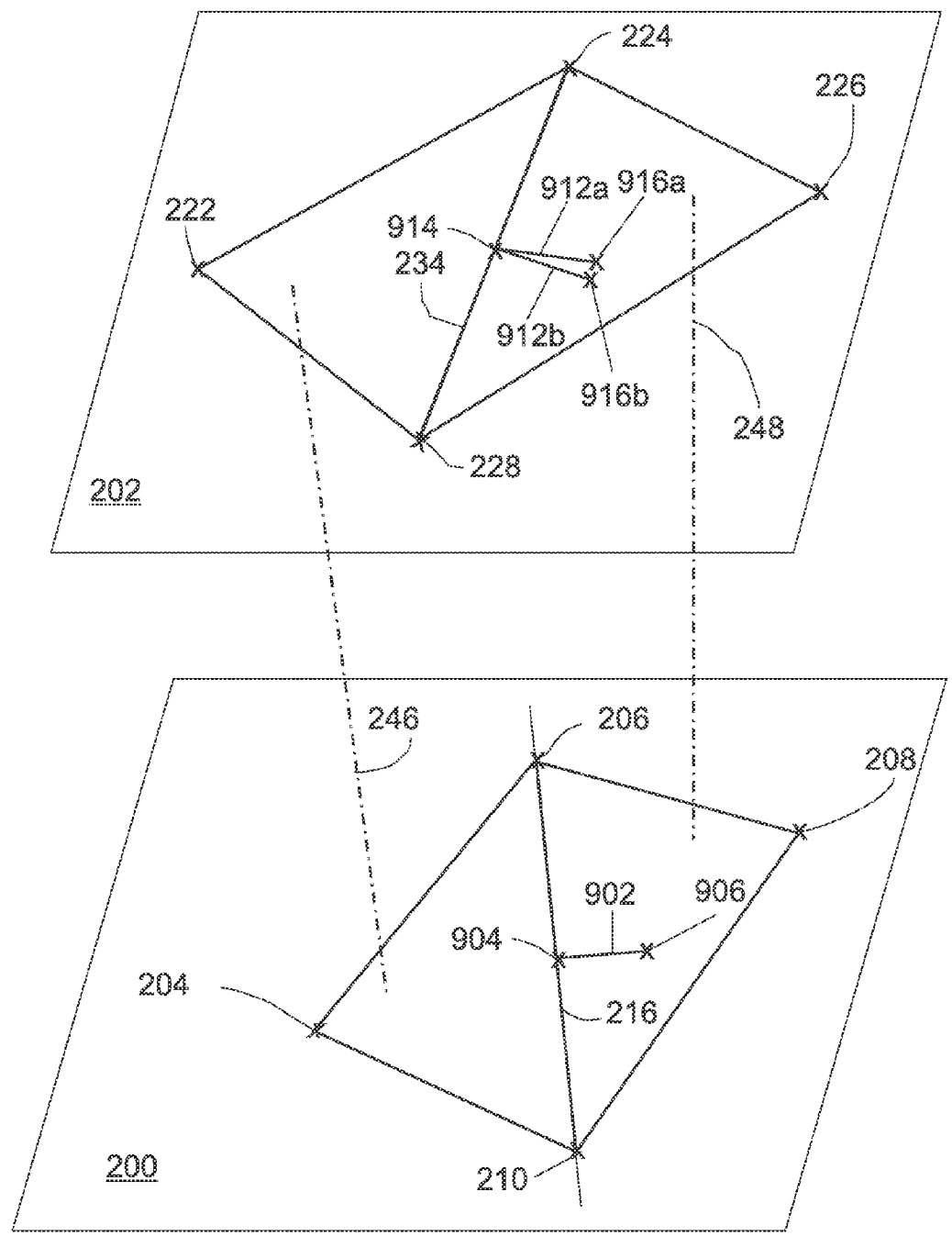
FIG. 9 is an exemplar-y illustration in 2D of a line-segment-of-action generated for the two neighbor 3-combinations shown in FIG. 7, and two transformed line-segment-of-actions transformed from the line-segment-of-action by the two affine transformations also shown in FIG. 7.

Referring to FIG. 9, it contains an exemplary illustration in 2D of a spatial agent consisting of two end points 904 and 906 of a line segment 902 that is perpendicular to line segment 216, which is also the common edge of two 3-combinations (204, 206, 210) and (206, 208, 210).

Figure 10:
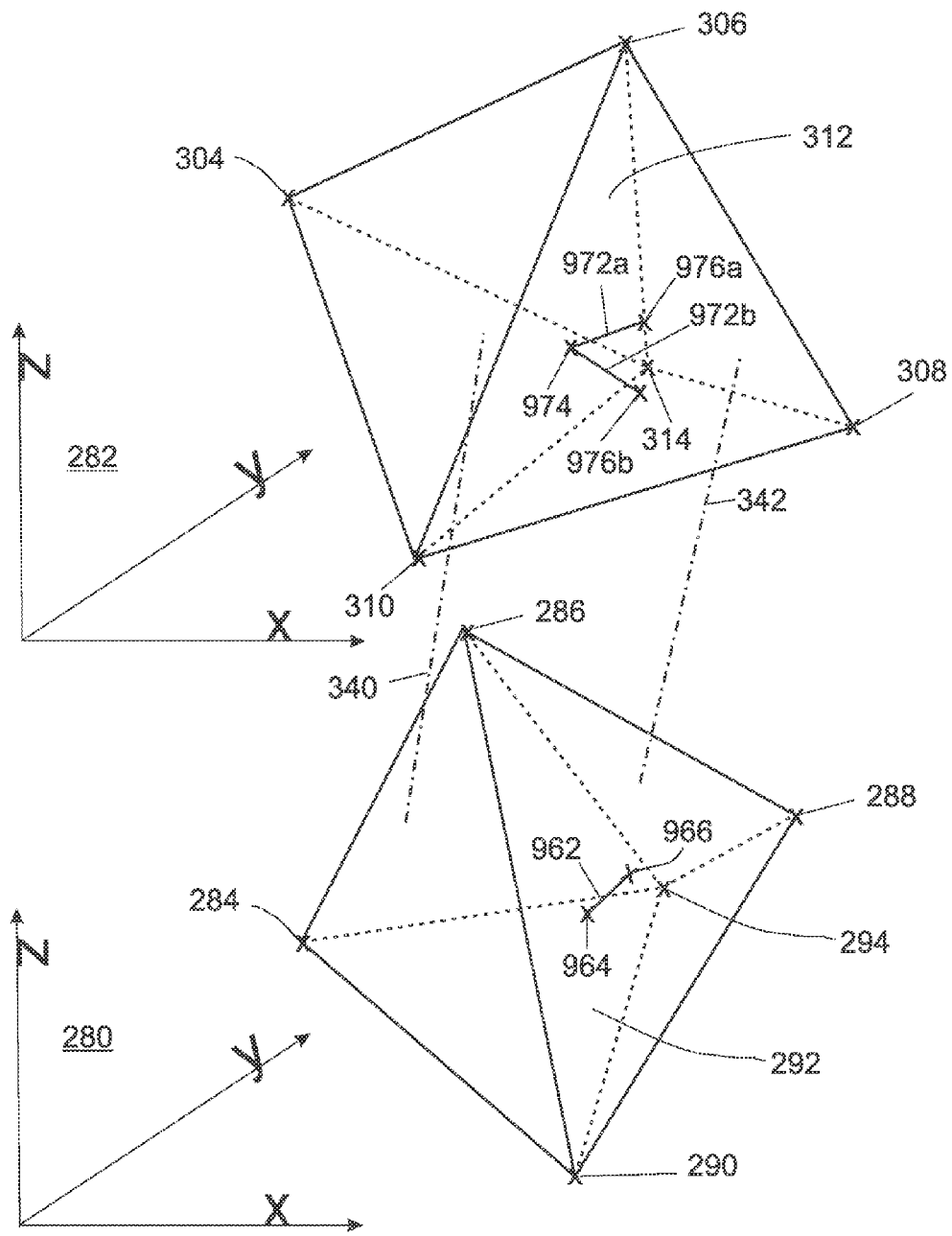
FIG. 10 is an exemplary illustration in 3D of a line-segment-of-action generated for the two neighbor 4-combinations shown in FIG. 8, and two transformed line-segment-of-actions transformed from the line-segment-of-action by the two affine transformations also shown in FIG. 8.

Referring to FIG. 10, it contains an exemplary illustration in 3D of a spatial agent consisting of two end points 964 and 966 of a line segment 962 that is perpendicular to triangle 292, which is also the common triangle of two 4-combinations (284, 286, 290, 294) and (286, 290, 294, 288).

Figure 4:
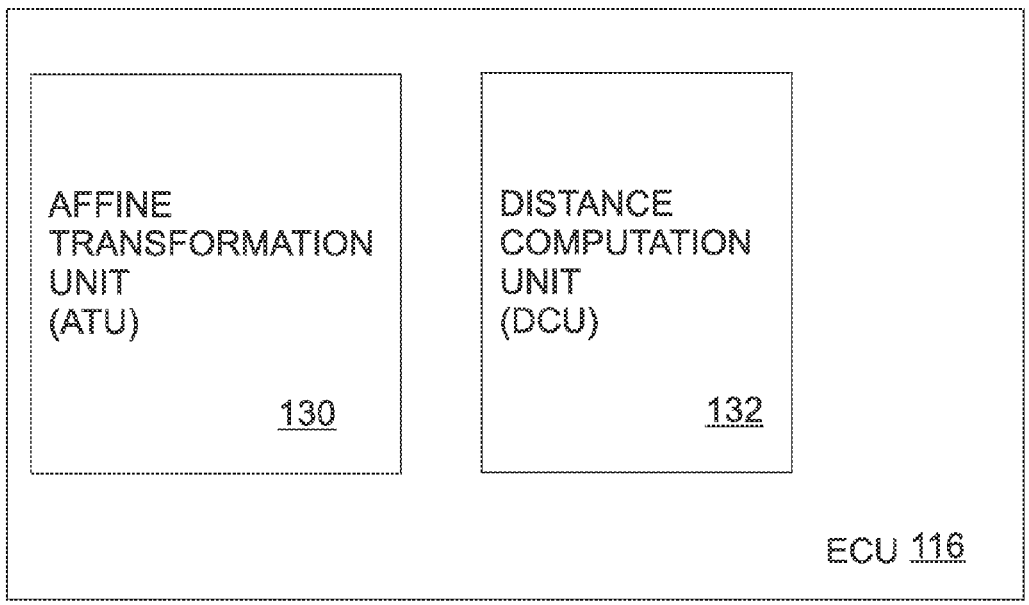
FIG. 4 is a block diagram of an illustrative embodiment of an energy computation unit shown in FIG. 2.

Referring to FIG. 4, ECU 116 contains an affine transformation unit (ATU) 130 and a distance computation unit (DCU) 132. ECU 116 receives at least a set of affine transformations generated by ACU 112 and a spatial agent generated by SADU 114. ATU 130 applies the affine transformations to the spatial agent, and DCU 132 compares the transformed spatial agents to generate a distance measure. In general, applying an affine transformation to a spatial agent involves either using the affine transformation, or the left sub-matrix of the affine transformation, to transform the points representing the spatial agent to obtain a new set of points that collectively represent a new spatial agent, which we will call a transformed or derived spatial agent.

A local distance measure summarizes the variability of a set of transformed spatial agents. In general, if two transformed spatial agents are involved, computing a local distance measure based on two transformed spatial agents involves comparing the two transformed spatial agents by:
  comparing the value of a predetermined geometric property in one transformed spatial agent with the value of the same geometric property in the other for at least one geometric property; or
  computing the value of at least one geometric property of a geometric object that is combinedly defined by the two transformed spatial agents; or
  combinations thereof.
Here, two geometric property of two transformed spatial agents are said to be the same geometric property if and only if they correspond to the same geometric property of the original spatial agent before transformation.

If more than two transformed spatial agents are involved, then computing an overall distance measure based on the more than two transformed spatial agents involves:
  computing at least a variability for one set of scalars, which are the values of the same geometric property of the more than two transformed spatial agents; or
  computing the value of at least one geometric property of a geometric object that is combinedly defined by the more than two transformed spatial agents; or
  comparing multiple pairs of transformed spatial agents, the multiple pairs selected from the more than two transformed spatial agents, to generate multiple local distance measures, and computing an overall distance measure based on the multiple local distance measures; or
  combinations thereof.

In this embodiment, after ACU 112 generates two affine transformations for each pair of neighbor mapped (n+1)-combinations generated by CSU 113, ATU 130 applies the two affine transformations to a spatial agent generated by SADU 114 for the same pair of mapped (n+1)-combinations to generate two transformed spatial agents, and DCU 132 compares the transformed spatial agents to generate a distance measure, which is called a local distance measure since the pair of neighbor mapped (n+1)-combinations defines a local sub-configuration (unless when this sub-configuration is the configuration, in which case the local distance measure is also an overall distance measure).

In this embodiment, I contemplate that applying an affine transformation to a line-segment-of-action involves applying the affine transformation to the two end points of the line-segment-of-action to get two new end points that define a new line segment, which is also called a transformed line segment, a transformed line-segment-of-action, or a derived line-segment-of-action. Using a pair of affine transformations to transform a line-segment-of-action involves applying the two affine transformations to get two transformed line-segment-of-actions sharing a common end point, which is contained in the image of the common edge of the associated neighbor mapped (n+1)-combinations. Comparing the transformed spatial agents involves computing the area of the parallelogram spanned by the two transformed line-segment-of-actions, i.e., in this embodiment the geometric object that is combinedly defined by the two transformed line-segment-of-action is the parallelogram spanned by the two transformed spatial agents, and the geometric property is the parallelogram's area.

In more detail, for a pair of affine transformations $T_1$, $T_2$ whose associated (n+1)-combinations have a common hyperplane H, and a line-segment-of-action $(\vec{p}, \vec{p}+\vec{v})$, where $\vec{p} \in H$. ATU 130 first apply the two affine transformations to the line-segment-of-action to compute two new (transformed) line-segment-of-actions, one of which is defined by the end points $T_1(\vec{p})$ and $T_1(\vec{p}+\vec{v})$, the other is defined by the end points $T_2(\vec{p})$ and $T_2(\vec{p}+\vec{v})$. Since $\vec{p} \in H$, $T_1(\vec{p}) = T_2(\vec{p})$.

Referring to FIG. 9, the two affine transformations 246 ($T_1$) and 248 ($T_2$) both transform common line segment 216 (H) to line segment 234, and since end point 904 ($\vec{p}$) belongs to line segment 216, the two affine transformations both transform it to a point 914 ($T_1(\vec{p})=T_2(\vec{p})$) in line segment 234. On the other hand, the point 906 ($\vec{p}+\vec{v}$) is transformed to two different points 916a ($T_1(\vec{p}+\vec{v})$) and 916b ($T_2(\vec{p}+\vec{v})$) as long as the two affine transformations are not the same. Since affine transformation maps lines to lines, line segment 902 is transformed by the two affine transformations to line segments 912a and 912b.

Referring to FIG. 10, the two affine transformations 340 ($T_1$) and 342 ($T_2$) both transform common triangle 292 (H) to triangle 312, and since end point 964 ($\vec{p}$) is contained in triangle 292, the two affine transformations both transform it to a point 974 ($T_1(\vec{p})=T_2(\vec{p})$) in triangle 312. On the other hand, the point 966 ($\vec{p}+\vec{v}$) is transformed to two different points 976a ($T_1(\vec{p}+\vec{v})$) and 976b ($T_2(\vec{p}+\vec{v})$) by the two affine transformations as long as the two affine transformations are not the same. Since affine transformation maps lines to lines, line segment 962 is transformed by the two affine transformations to line segments 972a and 972b.

Next, DCU 132 computes the area of the parallelogram spanned by the two transformed line-segment-of-actions sharing a common end point. There are various ways to compute the area of a parallelogram. In one embodiment, the area is computed by $$ab \sin \theta \quad (2)$$

where $a=\|T_1(\vec{p}+\vec{v})-T_1(p)\|$, $b=\|T_2(\vec{p}+\vec{v})-T_1(p)\|$, and $\theta$ is the angle the two line segments make at $\vec{p}$. Alternatively, if the cross product is defined, for example in 3D, the area can be computed by the magnitude of the cross product of the two vectors:

$$d(T_1,T_2)=\|(T_1(\vec{p}+\vec{v})-T_1(\vec{p}))\times(T_2(\vec{p}+\vec{v})-T_2(\vec{p}))\| \quad (3)$$

Yet another way to compute the area is by Heron's formula:

$$d(T_1,T_2)=2\sqrt{s(s-a)(s-b)(s-c)}$$

where $c=\|(T_1(\vec{p}+\vec{v})-T_2(\vec{p}+\vec{v})\|$, and $s=(a+b+c)/2$.

The above computations can be further simplified. Since $$T_1(\vec{p}+\vec{v}) - T_1(\vec{p}) = A(T_1)(\vec{p}+\vec{v}) + \vec{t}(T_1) - A(T_1)\vec{p} - \vec{t}(T_1)$$

$$= A(T_1)\vec{v}$$

Thus the area can be computed by the area of the parallelogram spanned by the two vectors $A(T_1)\vec{v}$ and $A(T_2)\vec{v}$, either by $$cd \sin \theta \quad (4)$$

where $c=\|A(T_1)\vec{v}\|$, $d=\|A(T_2)\vec{v}\|$, or, if the cross product is defined, by $$d(T_1,T_2)=\|(A(T_1)\vec{v})\times(A(T_2)\vec{v})\| \quad (5)$$

where in this embodiment $\|\cdot\|$ is used to denote the Euclidean norm $\|\vec{v}\|=(\vec{v}_1^2+\vec{v}_2^2+\ldots+\vec{v}_n^2)^{1/2}$. It shall be noted that the area does not depend on $\vec{p}$ as long as $T_1$, $T_2$ agree on it.

When more than one (former) local distance measures are generated as described above, ECU 116 may further compute one or more (latter) local or overall distance measures, each of which is based on at least a portion of the former local distance measures. While the former local distance measures summarize the variability of a set of transformed spatial agents, the latter local or overall distance measures summarize the central tendency of the former local distance measures.

After that, the local or overall distance measures may be integrated as energy terms into an energy score computed by EFCU 105, or used by themselves to indicate the quality of the configuration, for example to be displayed in an UI for the discretion of a human operator. I contemplate that in this embodiment, an overall distance measure is generated by computing the arithmetic mean of all local distance measures:

$$\frac{1}{N}\sum_{i=1}^{N} d(P_i) \quad (6)$$

where $d(P_i)$ is the local distance measure computed by ECU 116 for a pair of neighbor (n+1)-combinations $P_i$ generated by CSU 113, and N is the total number of pairs generated by CSU 113, N being equivalent to the total number of internal edges (or internal triangles in 3D). There are various ways to compute a local or overall distance measure from multiple local distance measures. In one embodiment, a local or overall distance measure is generated by computing the geometric mean of multiple local distance measures. In another embodiment, an overall distance measure is generated by computing a weighted average of multiple local distance measures. In yet another embodiment, a local or overall distance measure is set to be the maximum of all local distance measures.

In block 105, EFCU 105 may receive one or more local or overall distance measures generated by ECU 116 and computes one or more local or overall energy scores according to an energy function. In this embodiment, I contemplate that EFCU 105 computes an overall energy score:

$$E(c) = -1 + \beta \frac{1}{N} \sum_{i=1}^{N} d(P_i) \qquad (7)$$

where the second term $$\frac{1}{N} \sum_{i=1}^{N} d(P_i)$$

is an overall distance measure generated by ECU 116. $\beta$ is a predetermined control parameter that controls the strength of the second term in relevance to the first term.

Various conventional distance measures, such as intensity-based distance measures or feature based distance measures, can be added to the one or more distance measures generated by ECU 116. In one embodiment, where the points are SIFT extracted feature points to each of which is attached a 128-bit feature vector describing the local geometry surrounding it, EFCU 105 computes an overall energy score which involves Euclidean distances between pairs of feature vectors for pairs of corresponding points:

$$E(c) = -1 + \beta_1 \frac{1}{N} \sum_{i=1}^{N} d(P_i) + \beta_2 \frac{1}{M} \sum_{j=1}^{M} \| f(q_{j,1}) - f(q_{j,2}) \| \qquad (8)$$

Here $q_j$ stands for a pair of corresponding points, with $q_{j,1}$, $q_{j,2}$ denoting the template and reference points respectively. Local or overall energy scores may also contain terms representing external forces, penalty terms, or additional perturbations.

Figure 12:
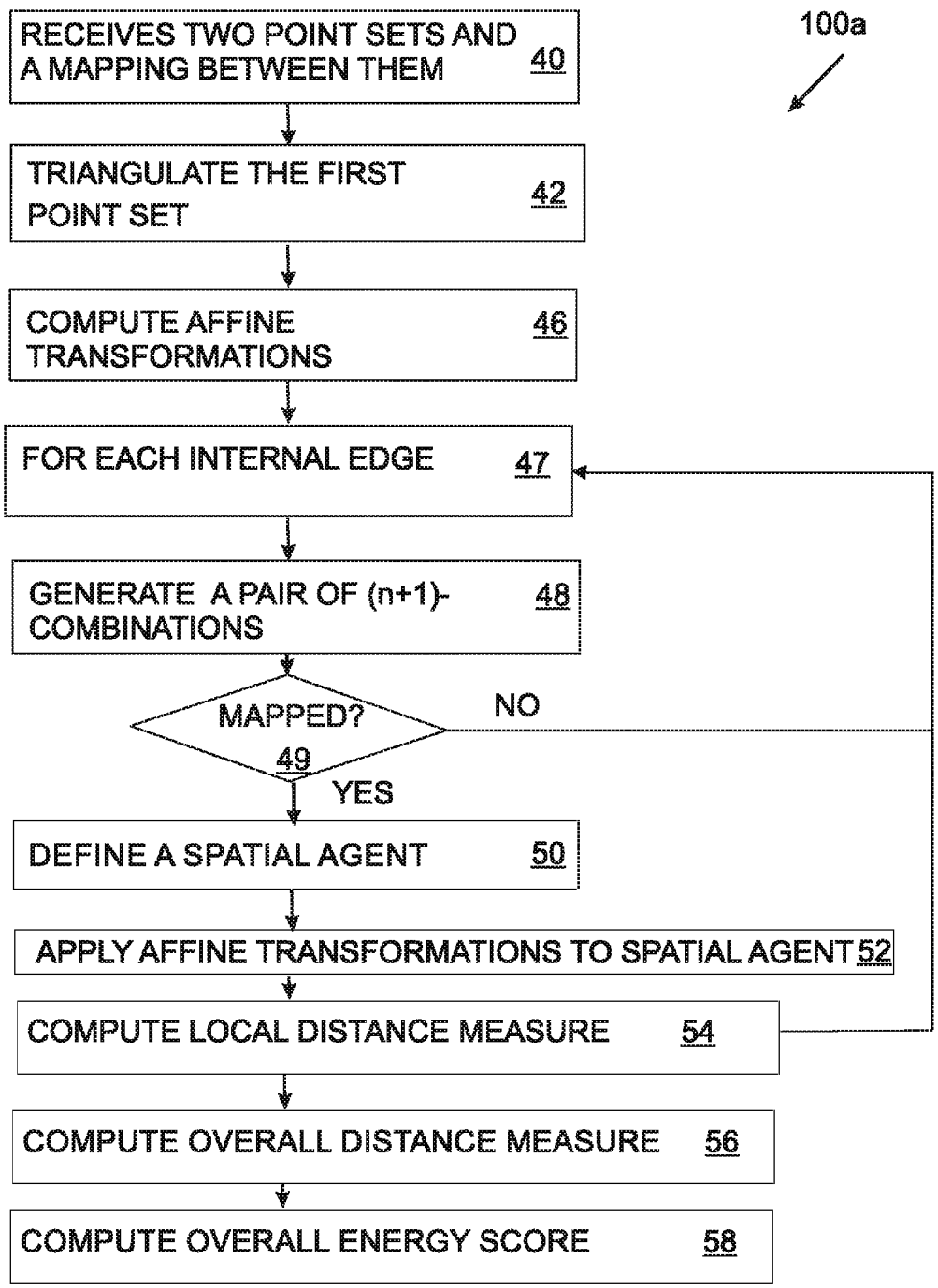
FIG. 12 is a flowchart of an exemplary process for evaluating a mapping between two spatial point sets using the matching evaluation unit shown in FIG. 2 and executed by the computer shown in FIG. 11.

Referring to FIG. 12, there is an exemplary process 100a carried out by the software system shown in FIG. 2 for evaluating a configuration. At 40, MEU 104 receives two point sets and a mapping between them. To fix notation, we call one of the two point sets a template point set, and the other a reference point set. In this embodiment, one point set is already designated as the template point set and the other is already designated the reference point set. Alternatively, MEU 104 can be configured to arbitrarily chose one point set as the template point set and the other as the reference point set.

At 42, TU 106 triangulate the template point set using Delaunay triangulation in n D.

At 46, ACU 112 computes multiple affine transformations. For each template simplex, ACU 112 checks whether all of its vertices are mapped. If the answer is yes, then it computes an affine transformation according to equation 1.

At 47, the process iterates through all internal edges of the triangulation. For each internal edge, at 48, CSU 113 creates a pair of neighbor (n+1)-combinations, which are not guaranteed to be mapped.

At 49, the process checks if both of the (n+1)-combinations are mapped, if the answer is no then the process ignores the remaining steps in the loop and goes back to step 47. Otherwise, at 50, SADU 114 defines a spatial agent for the pair of neighbor mapped (n+1)-combinations, where a line-segment-of-action is created as described.

At 52, in this embodiment, for the pair of neighbor mapped (n+1)-combinations, the affine transformations generated from them at step 46 are located, then ATU 130 applies the two affine transformations to the line-segment-of-action to generate two transformed spatial agents.

At 54, the two transformed line-segment-of-actions are compared in DCU 132 to generate a local distance measure according to equation 2, where the local distance measure is the area of the parallelogram spanned by the two transformed line-segment-of-actions.

After going through the loop for multiple times, multiple local distance measures are generated at 54 for multiple pairs of neighbor mapped 3-combinations. At 56 ECU 116 creates one or more overall distance measures from the multiple local distance measures. In this embodiment, one overall distance measure is created according to equation 6.

Finally, at 58, an overall energy score is computed by EFCU 105. In this embodiment, EFCU 105 creates an overall energy score according to equation 7, of which the overall distance measure created at step 56 by ECU 116 is the second term (if we ignore the control parameter).

One skilled in the art will appreciate that, for this and other processes, the steps may be implemented in different order. For example, in one embodiment, an affine transformation is computed only after a pair of neighbor mapped 3-combinations containing the associated 3-combination has been generated and a spatial agent has been defined. Furthermore, the steps are only provided as examples. thus some steps may be optional, combined into fewer steps, or expanded into additional steps. Further, the outlined software components are provided as examples. That is, units may be combined, sub-units may be organized in different ways, or parent units may be expanded to include additional units without distracting from the essence of the disclosed embodiments.

DETAILED DESCRIPTION

Second Embodiment

Figure 13:
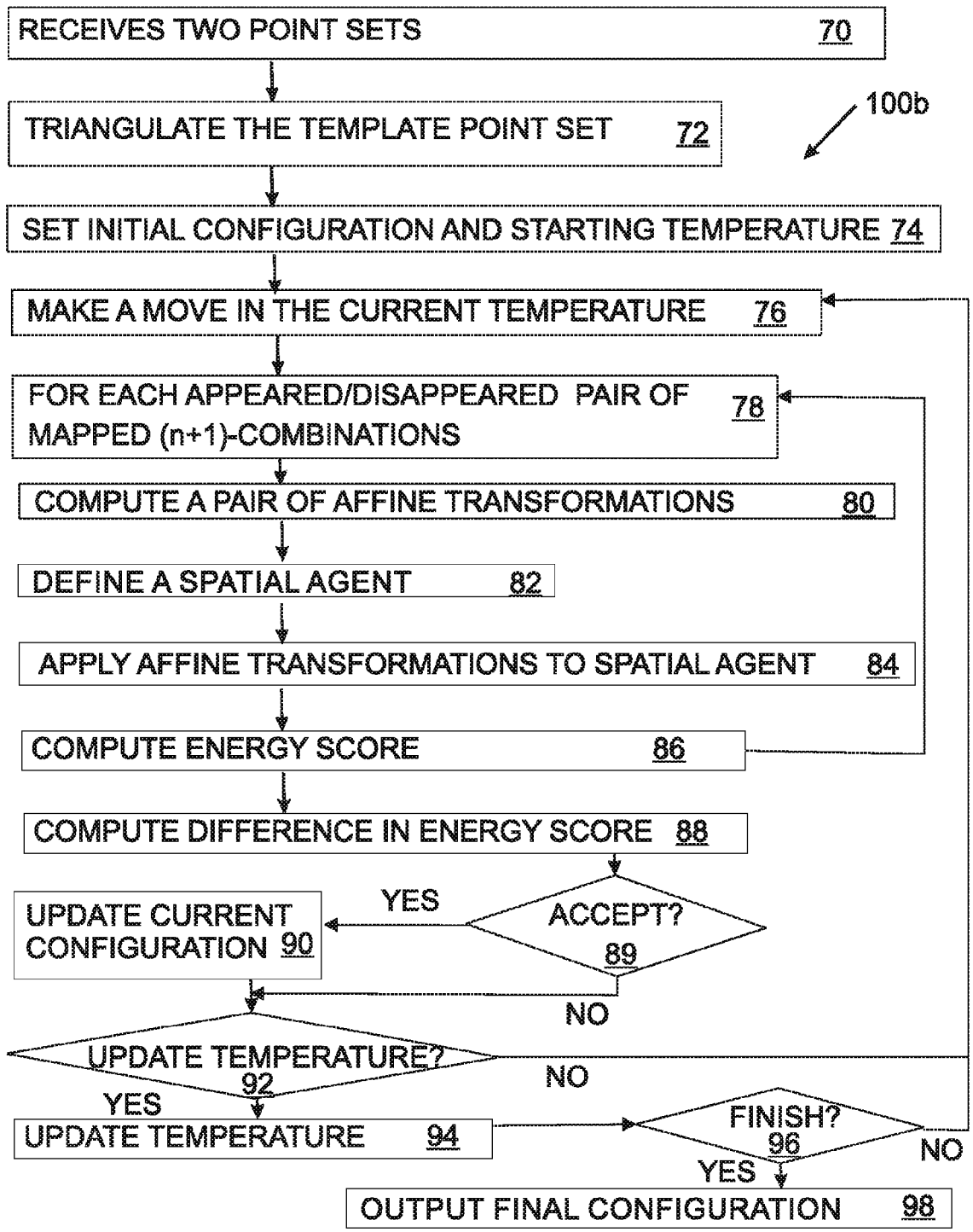
FIG. 13 is a flowchart of an exemplary process for matching two spatial point sets using the matching unit shown in FIG. 1 and executed by the computer shown in FIG. 11.

Referring to FIG. 13, there is another exemplary process 100b carried out by the software system shown in FIG. 1 for matching two point sets using Simulated Annealing. This exemplary process is shown in 2D, but to convert it to 3D only minor changes (e.g. 3-combinations to 4-combinations, common edge to common triangle, triangles to tetrahedra) is necessary. At 70, MU 100 receives two spatial point sets. To fix notation, we call one of the two point sets a template point set, and the other a reference point set. In this embodiment, one point set is already designated as the template point set and the other is already designated the reference point set. Alternatively, MU 100 can be configured to arbitrarily chose one point set as the template point set and the other as the reference point set.

At 72, TU 106 triangulate the template point set using Delaunay triangulation.

At 74, in IU 118, a random configuration is created to be the initial configuration by a random walk in the configuration space, and a starting temperature is chosen according to 10max|ΔE|, where max|ΔE| is obtained by recording the maximum energy score difference during any move in a random walk in the space of configurations.

At 76, for the current temperature, MGU 120 perform a move according to moving class B as described before. From the current configuration a move generates a new configuration, which is a neighbor of the current configuration that contains some of the cross-edges of the current configuration. The Cuts of some cross-edges and the Nits of some other cross-edges lead to the appearance of some mapped 3-combinations and the disappearance of some other mapped 3-combinations in $V_1$. Consequently, if one collects all pairs of neighbor mapped 3-combinations from the new configuration, and remove from them those that are already present in the current configuration, he gets all appeared pairs of neighbor mapped 3-combinations. Similarly, if one collects all pairs of neighbor mapped 3-combinations from the current configuration, and remove from them those that are also in the new configuration, he gets all disappeared pairs of neighbor mapped 3-combinations (see "An Affine Energy Model for Image Registration Using Markov Chain Monte Carlo" by Yang and Keyes for some exemplary illustrations and descriptions of the Cut-Nit process).

Multiple local energy scores are created by looping between 78 and 86, within each loop, a local energy score is computed for a pair of disappeared or appeared neighbor mapped 3-combinations. At 78, a pair of appeared or disappeared neighbor mapped 3-combinations $P_i$ is selected for processing. At 80, ACU 112 computes two affine transformations $T_{i,1}$, $T_{i,2}$ for the pair of neighbor mapped 3-combinations according to equation 1. At 82, SADU 114 defines a spatial agent for the pair of neighbor mapped 3-combinations, where a line-segment-of-action is created as described before. At 84, ATU 130 applies $T_{i,1}$, $T_{i,2}$ to the line-segment-of-action defined at 82 to generate two transformed spatial agents. At 86, the two transformed line-segment-of-actions are compared in DCU 132 to generate a local energy score:

$$\delta_i(-1+\alpha d(T_{i,1}T_{i,2})) \quad (9)$$

where $d(T_1, T_2)$ is given by equation 2, $\alpha$ is a predetermined control parameter, and $\delta_i=1$ if it is a pair of appeared 3-combinations and $\delta_i=-1$ if it is a pair of disappeared 3-combinations.

At 88, the local energy scores are summed up to get a difference in energy scores between the new configuration and the current configuration:

$$\Delta E = \sum_{i=1}^{s} \delta_i(-1 + \alpha d(T_{i,1}, T_{i,2})) \quad (10)$$

where s is the total number of pairs of appeared/disappeared neighbor mapped 3-combinations for the current move.

At 89, in MSU 122, each move is accepted if $$r < e^{\frac{-\Delta E}{T}},$$

where r is a sample of a random variable uniformly distributed in [0, 1], and rejected otherwise. If the move is accepted, then at 90 the new configuration is used to update the current configuration.

At 92, the process determines whether a predetermined number of moves have been attempted at the current temperature. If the answer is yes, the current temperature is updated at 94 according to $T_{current}=T_{current}*f$, where f is a cooling factor usually in the range of [0.8, 0.999], and then the process proceeds to step 96. Otherwise the process goes back to step 76.

At 96, if the new temperature is lower than a predetermined threshold, then at 98 the process print out the final configuration and stops. Otherwise the process goes back to step 76 to start a new move in the new temperature.

Here again, some steps may be implemented in different order. For example, step 80 and step 82 can be implemented in reverse order. Also various alternatives discussed before for various blocks can be employed. Further, the outlined software components are provided as examples. That is, some units may be combined, sub-units may be organized in different ways, or parent units may be expanded to include additional units without distracting from the essence of the disclosed embodiments.

DETAILED DESCRIPTION

Third Embodiment

In yet another embodiment, in nD, a spatial agent consists of n+1 points corresponding to the end points of n orthogonal unit line segments sharing a common end point, which we call the first point. The remaining n points are the distinct end points, where each of which belongs to one and only one line segment. We call this spatial agent a basis-of-action. In this embodiment generating local distance measures involves:
1. Computing the maximum distance between any two images of the common end point; and
2. Computing the sample standard deviation of the n−1th positive roots of the areas of the two or more transformed (n−1)D simplices, each of which is defined by the convex hull of the images of the it distinct end points under one of the affine transformations. Used this way, a basis-of-action is equivalent to a combination of a point-of-action and a simplex-of-action.

Figure 14:
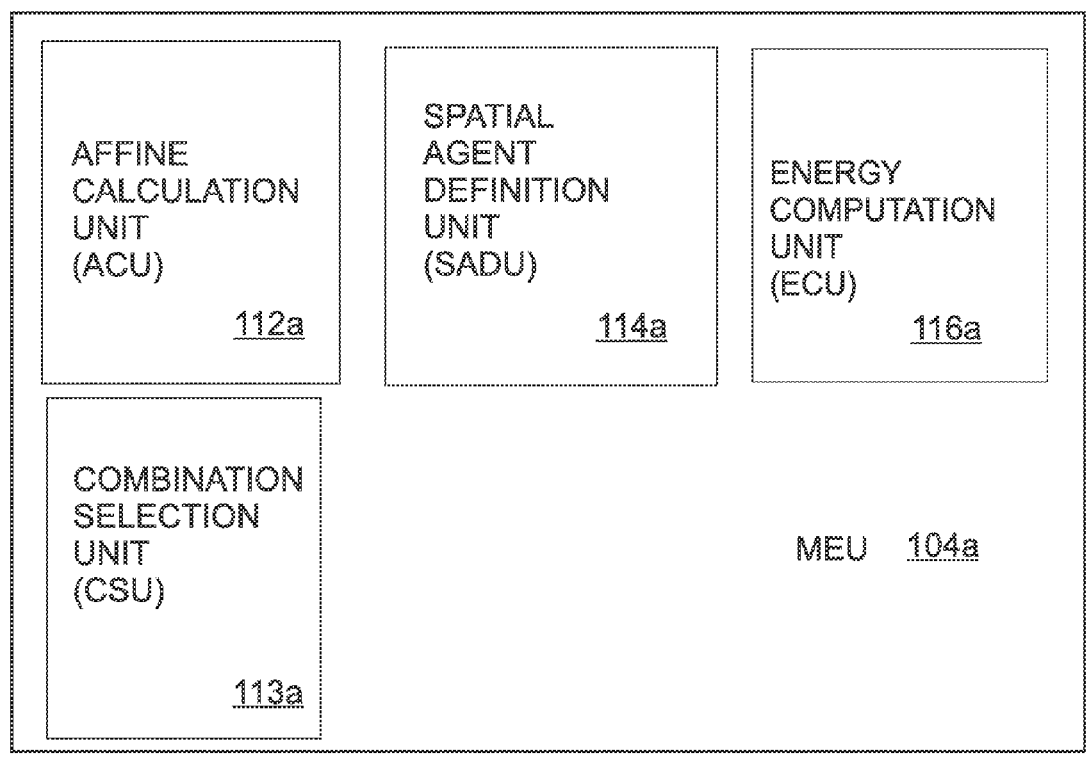
FIG. 14 is another block diagram of an illustrative embodiment of an matching evaluation unit shown in FIG. 1.

FIG. 14 is a block diagram of an illustrative embodiment of a mapping evaluation unit MEU 104a. As shown in FIG. 2, MEU 104a includes an affine calculation unit (AC)) 112a, a spatial agent definition unit (SADU) 114a, a combination selection unit (CSU) 113a, and an energy computation unit (ECU) 116a. MEU 104a receives as input at least a first point set (template point set) $V_1$, a second point set (reference point set) $V_2$, and a one-to-one mapping between the two point sets. As output, it calculates one or more overall distance measures.

Let $V'_1$ denote the non-isolated points of $V_1$. In block 112a, in this embodiment, CSU 113a generates a set of mapped (n+1)-combinations, the set consisting of all (n+1)-combinations of $V'_1$. Thus the set has $$\binom{|V'_1|}{n+1}$$

distinct members. For each such (n+1)-combinations, ACU 112a computes an affine transformation using equation 1.

Alternatively, instead of selecting all (n+1)-combinations of $V'_1$, there are various ways to select a set of (n+1)-combinations. In one embodiment, for each n-combination of $V'_1$, a point in the rest of $V'_1$ is chosen such that the circle (or sphere in 3D) passing through the n+1 points (the n members of the n-combination and the chosen point) has the smallest radius. The n-combination is then combined with the chosen point to form an n+1-combination. The number of (n+1)-combinations formed this way is the same as the number of n-combinations, which is usually much less than the total number of (n+1)-combinations. In another embodiment, $V'_1$ is triangulated to generated a triangulation, and a set of mapped (n+1)-combinations is generated by CSU 113a, each member of the set contains the vertices of a mapped template triangle. In yet another embodiment in 2D, a set is generated by randomly select a predetermined number of 3-combinations from all possible 3-combinations. This can be done, for example, by selecting three points from $V'_1$ without replacement, put the three points back, and repeat this for the predetermined number of times.

In this embodiment, the set of computed affine transformations will be denoted by $AT=\{AT_1, \ldots, AT_m\}$, $|AT|=m$.

In block 114a, SADU defines a basis of action where the common end point is located at the center of the first point set $V_1$. Here the center of a point set $\vec{p}$ is obtained by adding the points' positions and dividing by the total. Alternatively, there are many ways to place the common end point. For example, the center of a point set can be placed at the center of the bounding box of the point set, or obtained by computing a weighted average of the positions of individual points.

The basis-of-action is then defined by adding to $\vec{p}$ a set of basis vectors $\vec{v}_1, \vec{v}_2, \ldots, \vec{v}_n$ to form n distinct end points $\vec{p}+\vec{v}_1, \vec{p}+\vec{v}_2, \ldots, \vec{p}+\vec{v}_n$. The n line segments are $[\vec{p}, \vec{p}+\vec{v}_1]$, $[\vec{p}, \vec{p}+\vec{v}_2], \ldots, [\vec{p}, \vec{p}+\vec{v}_n]$. The convex hull of the n distinct end points is said to be an (n+1)D simplex-of-action.

There are various ways to choose basis vectors. For example, in 2D, $\{(1,0), (0,1)\}$ is the standard basis (which is used in this embodiment), other choices are available, for example, $$\left\{\left(\frac{\sqrt{3}}{2}, \frac{1}{2}\right), \left(\frac{1}{2}, -\frac{\sqrt{3}}{2}\right)\right\} \text{ and } \left\{\left(\frac{1}{\sqrt{2}}, \frac{1}{\sqrt{2}}\right), \left(\frac{1}{\sqrt{2}}, -\frac{1}{\sqrt{2}}\right)\right\}$$

are both feasible choices.

In ECU 116a, members of AT are applied to the basis-of-action to generate multiple transformed basis-of-actions. For each $AT_i \in AT$, the transformed basis-of-action is defined by points: $AT_i(\vec{p}), AT_i(\vec{p}+\vec{v}_1), AT_i(\vec{p}+\vec{v}_2), \ldots, AT_i(\vec{p}+\vec{v}_n)$. The convex hull of $AT_i(\vec{p}+\vec{v}_1), AT_i(\vec{p}+\vec{v}_2), \ldots, AT_i(\vec{p}+\vec{v}_n)$ is a transformed (n−1)D simplex-of-action transformed from the (n−1)D simplex-of-action by $AT_i$.

Next, in nD an overall distance measure is computed as:

$$d = \max_{i \neq j} \|AT_i(\vec{p}) - AT_j(\vec{p})\| + \alpha \sqrt{\frac{1}{m}\sum_{i=1}^{m}\left((\text{area}(AT_i(\vec{p}+\vec{v}_j)))^{\frac{1}{n-1}} - \mu\right)^2} \quad (11)$$

where $$\mu = \frac{1}{m}\sum_{i=1}^{m}(\text{area}(AT_i(\vec{p}+\vec{v}_j)))^{\frac{1}{n-1}}$$

and α is a predetermined control parameter that controls the strength of the second term in relevance to the first term.

In 2D:

$$\text{area}(AT_i(\vec{p}+\vec{v}_j))=\text{length}(AT_i(\vec{p}+\vec{v}_1), AT_i(\vec{p}+\vec{v}_2))=\|AT_i(\vec{p}+\vec{v}_1)-AT_i(\vec{p}+\vec{v}_2)\|$$

In 3D:

$$\text{area}(AT_i(\vec{p}+\vec{v}_j))=\text{area}(AT_i(\vec{p}+\vec{v}_1), AT_i(\vec{p}+\vec{v}_2), AT_i(\vec{p}+\vec{v}_3))$$

which can be computed in various ways similar to the computation of the area of parallelograms described before.

Alternatively, there are various measures other than the sample standard deviation for measuring variability. In another embodiment, the range is used. In yet another embodiment, the inter-quartile range is employed. In yet another embodiment, in ECU 116a, a pairwise distance measure for any (p,q): p≠q is computed as:

$$d(AT_p, AT_q) = \|AT_p(\vec{p}) - AT_q(\vec{p})\| + \beta\left|(\text{area}(AT_p(\vec{p}+\vec{v}_j)))^{\frac{1}{n-1}} - (\text{area}(AT_q(\vec{p}+\vec{v}_j)))^{\frac{1}{n-1}}\right| \quad (12)$$

And an overall distance measure is computed by:

$$\frac{1}{\binom{m}{2}}\sum_{p \neq q} d(AT_p, AT_q) \quad (13)$$

Figure 15:
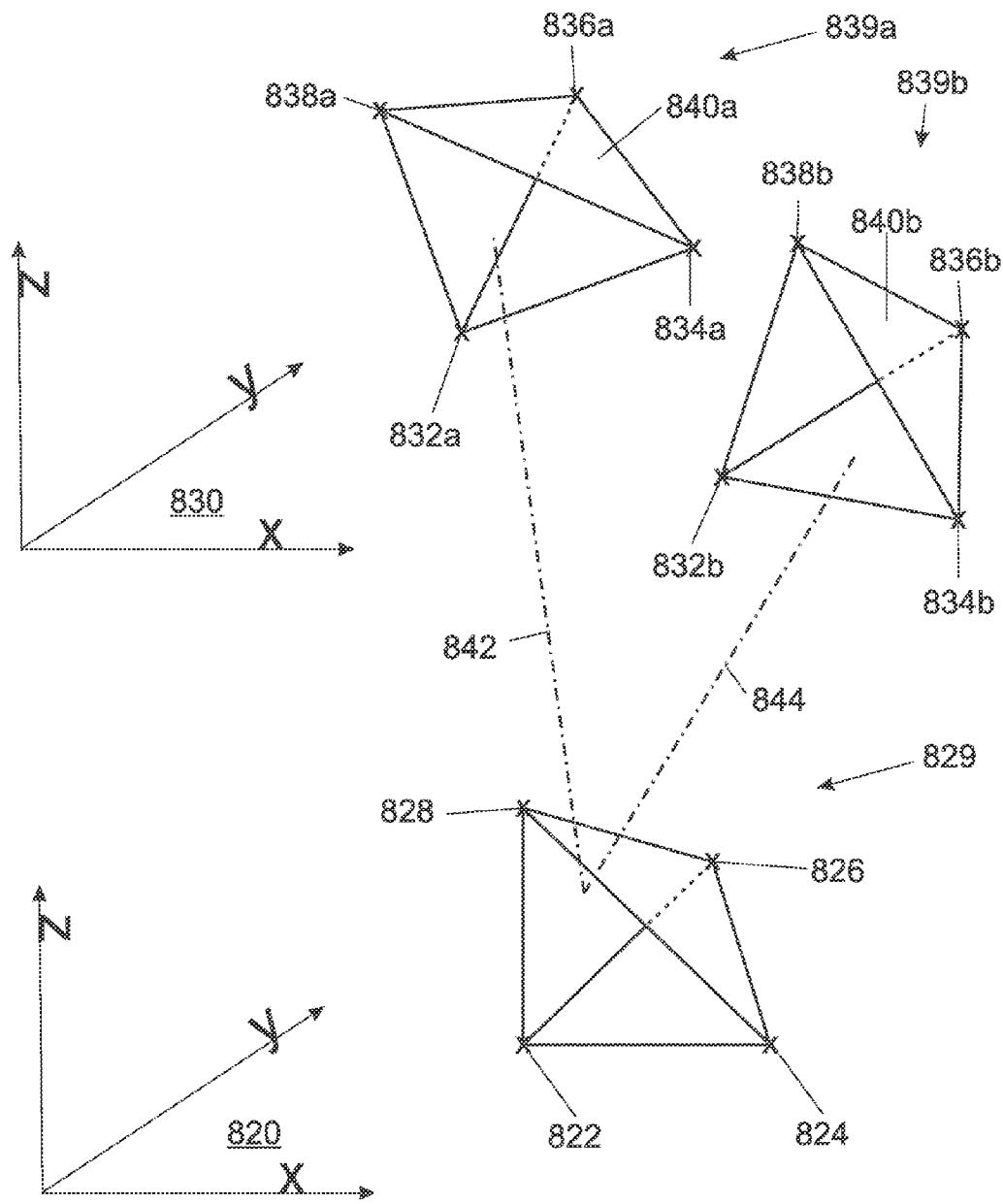
FIG. 15 is an exemplary illustration in 3D of a basis-of-action, two affine transformations, and two transformed basis-of-actions.

Referring to FIG. 15, it contains an exemplary illustration in a 3D space 820 of a basis-of-action 829 consisting of four end points 822($\vec{p}$), 824 ($\vec{p}+\vec{v}_1$), 826($\vec{p}+\vec{v}_2$), 828($\vec{p}+\vec{v}_3$). Point 822 is the common end point. An affine transformation 842 ($AT_1$) transforms basis-of-action 829 to a transformed basis-of-action 839a in a 3D space 830, the basis-of-action 839a has a common end point 832a ($AT_1(\vec{p})$), which is the image of point 822 under affine transformation 842, and three distinct end points 834a ($AT_1(\vec{p}+\vec{v}_1)$), 836a ($AT_1(\vec{p}+\vec{v}_2)$), 838a ($AT_1(\vec{p}+\vec{v}_3)$), which are the images of points 834, 836, 838 respectively; similarly, another affine transformation 844 ($AT_2$) transforms basis-of-action 829 to a transformed basis-of-actions 839b with a common end point 8321b ($AT_2(\vec{p})$) and three distinct end points 834b ($AT_2(\vec{p}+\vec{v}_1)$), 836b ($AT_2(\vec{p}+\vec{v}_2)$), 838b ($AT_2(\vec{p}+\vec{v}_3)$). Since there are only two affine transformations in this exemplary illustration, the first term in equation 11 computes the distance between points 832a and 832b ($\|AT_1(\vec{p})-AT_2(\vec{p})\|$), and the second term computes the sample standard deviation of the square roots of the areas of the transformed (n−1)D simplices. Although in this illustration, only two affine transformations are involved, it is to be understood that there can be more than two affine transformations, and the spatial dimension is not limited to 3D.

Because of the geometric properties we have chosen to compute in this embodiment, using a basis-of-action is equivalent to using a point-of-action and a simplex-of-action. As we've seen before, a spatial agent can have various configurations and include a plurality of spatial agents.

Figure 16:
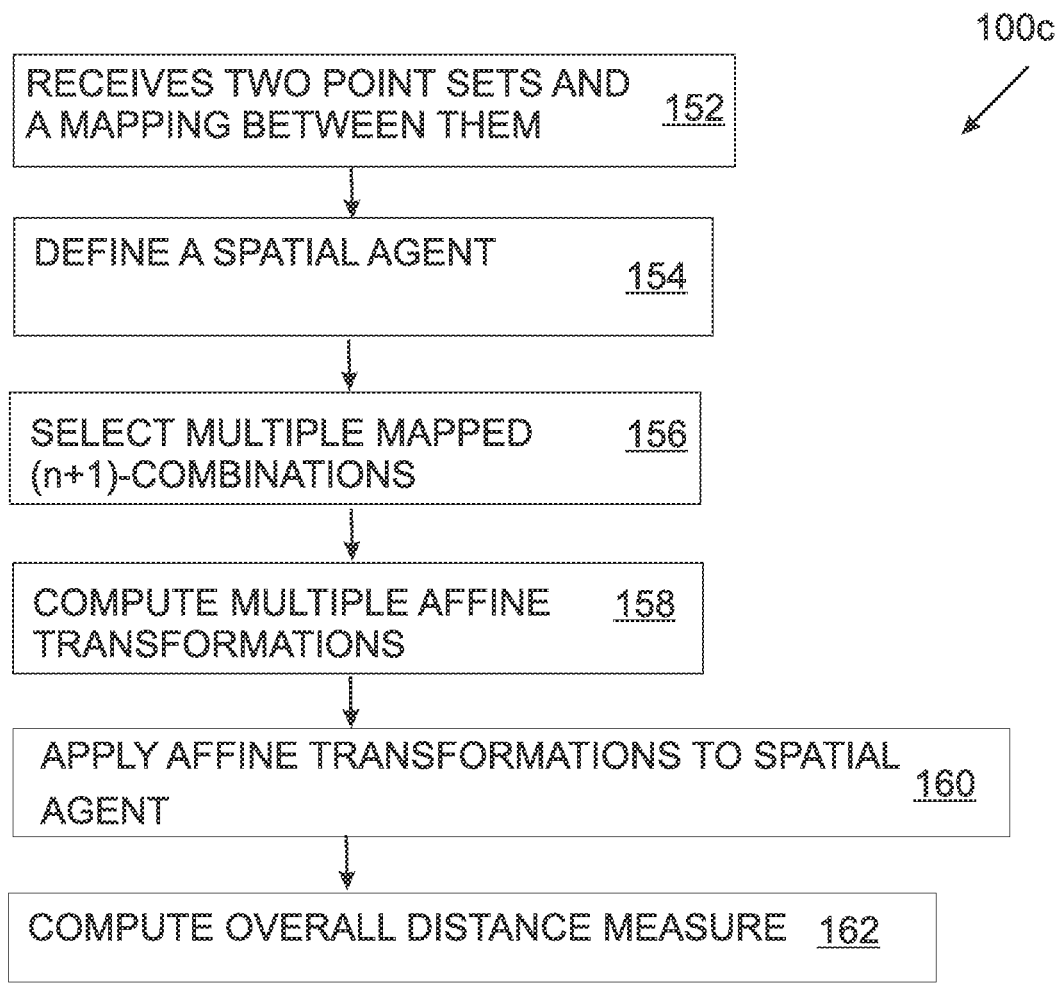
FIG. 16 is a flowchart of an exemplary process for evaluating a mapping between two spatial point sets using the matching evaluation unit shown in FIG. 14 and executed by the computer shown in FIG. 11.

Referring to FIG. 16, there is an exemplary process 100c carried out by the software system shown in FIG. 14. At 152, MEU 104a receives two spatial point sets and a mapping between them. To fix notation, we call one of the two point sets a template point set $V_1$, and the other a reference point set $V_2$. In this embodiment, one point set is already designated as the template point set and the other is already designated the reference point set. Alternatively, MEU 104a can be configured to arbitrarily chose one point set as the template point set and the other as the reference point set.

At 154, SADU 114a defines a spatial agent. In this embodiment, it is a basis-of-action whose common end point is placed at the center of the template point set.

At 156, CSU 113a generates a set of (n+1)-combinations of $V_1$, the set consisting of all mapped (n+1)-combinations in $V_1$.

At 158, for each member of the set of mapped (n+1)-combinations generated by CSU 113*a*, ACU 112*a* computes an affine transformations according to equation 1.

At 160, ECU 116*a* applies the multiple affine transformations generated at 158 to the basis-of-action to generate multiple transformed basis-of-actions. At 162, in this embodiment, an overall distance measure is computed according to equation 11, One skilled in the art will appreciate that, for this and other processes, the steps may be implemented in different order. For example, referring to FIG. 16, the spatial agent can be defined (step 154) before or directly after the multiple of affine transformations are computed (step 158) without affecting the functionality.

Figure 11:
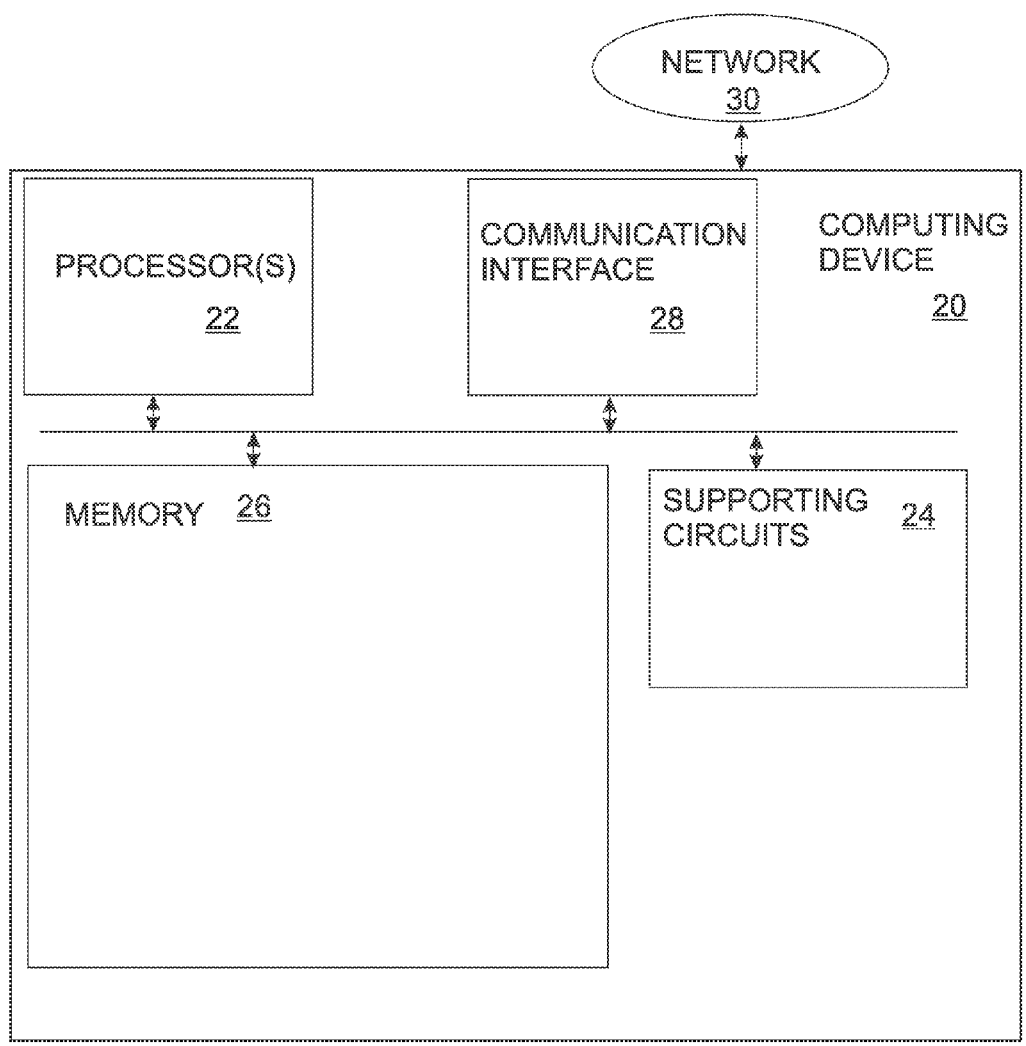
FIG. 11 is a block diagram of an exemplary computer system.

A computing device is defined to comprise one or more general purpose digital processors, one or more memory modules, and some supporting circuits. The computer is programmed to be capable of encoding a one-to-one mapping between point sets, encoding sets, defining geometric points, computing affine transformations, and applying affine transformations to points. Some embodiments may further requires the computer to be capable of triangulating point sets. FIG. 11 depicts a computer 20 comprising one or more processors 22, memory modules 26, and supporting circuits 24. It may further includes a communication interface 28 that receives inputs and send outputs to an external network 30. The one or more processors 22 may be microprocessors, controllers or any other suitable type of processors for processing and computing executable instructions. Supporting circuits 24 comprise well-known circuits such as I/O controllers, power supplies, data buses, and the like. Memories 26 comprises storage devices such as read-only memory (ROM), dynamic random-access memory (DRAM), and the like. Memories 26 provides temporary storage for operation system instructions, which provides an interface between the software applications being executed and the hardware components. Memories 26 is further loaded with instructions for operating control structures (e.g., if else, loop, etc.), computing affine transformations, defining points, and applying affine transformations to sets, it is further loaded with data structures for the temporary storage of data structures representing, for example, one-to-one mappings, affine transformations, spatial points, individuals or sets of combinations, and individuals or sets of spatial points. The disclosed embodiments may involve various suitable operating systems, such as Microsoft Windows, Unix, LINUX and the like. It further provides temporary storage for the data and programming instructions for one or more units of the above described embodiments, The processors and memories may be local (e.g. a single PC), distributed (e.g. a computer cluster), or located remotely and accessed via a network or other communication link (e.g. using communication interface 28). Computer 20 may further comprise storage devices for recording instructions of computer programs into a record medium, or loading instructions from a record medium into memory. For example, such record medium may include internal hard drive, external hard drives, FLASH drives, optical disks, and cloud based storages accessible through Internet.

A spatial point comprises a label and its coordinates. In this embodiment, a label is a positive integer, and its coordinates are encoded into an array data structure. Alternatively, a label can be any identifier as long as it uniquely identifies a point within a point set. In one embodiment, the memory address of a point's coordinate vector is used as the point's label. In another embodiment, a computer generated unique id (GUID) is used as the point's label. Besides being encoded into an array or a vector, one can encode the coordinates of a spatial point into various data structures, for example a custom made structure. Blow is an exemplary illustration in C++ of a class that implements the basic aspects of points in 2D.

```
struct MyPoint{
  public:
    double a,b; //elements of the vector
    MyPoint(double a1, double a2):a(a1),b(a2){ }
    //add a second point to the current point
    inline MyPoint& operator+(const MyPoint & secondvec){
      a+=secondvec.a;
      b+=secondvec.b;
      return *this;
    }
    //subtract a second point from the current point
    inline MyPoint& operator-(const MyPoint & secondvec) {
      a-=secondvec.a;
      b-=secondvec.b;
    }
    //inner product
    inline double operator*(const MyPoint & secondvec) {
      return sqrt(a*secondvec.a+b*secondvec.b);
    }
};
```

In some embodiments, I contemplate that an (n+1)-combination is implemented as an integer array of fixed size (n+1), where the values are the labels of the template points. Alternatively, an (n+1)-combination can be implemented as a linked list, a stack, a suitable sequential or random access data structure, or a custom coded data structure including n+1 coordinate values and interface to access them.

In this embodiment, to choose all (n+1) combinations from $V_1$, where $|V_1|=n$, I contemplate that the MATLAB® function "nchoosek" is used. Alternatively, in C++, either "std::next_combination" in the Standard Template Library (STL) or "boost::algorithm::next_combination" in the Boost library can generate combination iteratively. In addition, in "Art of Computer Programming Volume 4: Fascicle 3" by Donald Knuth (Addison-Wesley Professional, April 2008) there is provided various algorithms for implementing one's own custom code.

In some embodiments, I contemplate that a mapping between two point sets is implemented as an integer valued array, where the indices are the labels of the template points and the values are the labels of the reference points. When a template point is isolated, it indexes into a null reference label, which is an identifier that doesn't label any reference point. Otherwise it indexes into the corresponding reference label. Implemented this way, a Cut of a cross-edge between a template point and a reference point comprises changing the value indexed by the template point's label from the reference point's label to the null reference label; and a Nit of a template point with a reference point involves changing the value indexed by the template point's label to the reference point's label.

Alternatively, the mapping can be encoded in various data structures, such as the adjacency matrix, the incidence matrix, the adjacency list, and the incidence list. It is obvious how Cut and Nit steps can be implemented accordingly.

In some embodiments, I contemplate that a triangulation in 2D is implemented as an n*3 matrix, each row of which consists of the labels of the three vertices of a triangle. Similarly, in 3D, a triangulation can be implemented as an n*4 matrix, each row of which consists of the labels of the four vertices of a tetrahedron. There are various ways to represent a triangulation, for example the winged-edge, the quad-edge, and the half-edge data structures.

In some embodiments, instructions for linear algebra functionalities (e.g. a linear algebra library) is loaded in memories 26 such that the basic linear algebra procedures such as matrix-vector multiplication, vector-vector inner product, matrix subtraction and addition, vector subtraction and additions are provided. Then, if in homogeneous coordinates, an affine transformation in n–D can be represented as an (n+1)-by-(n+1) matrix, and applying the affine transformation to a point can be implemented as a matrix-vector multiplication; otherwise an affine transformation can be represented as the combination of an n-by-n matrix and a vector in n–D, where applying the affine transformation to a vector can be implemented as a matrix-vector production followed by a vector-vector addition.

Alternatively, an affine transformation may be custom coded so that the data structure comprises the variables of the affine transformation with a programming interface for functionalities such as applying the affine transformations to a point. Shown below is an exemplary illustration in C++ of a class that implements basic aspects of the affine transformation in 2D. One can convert the source code into other programming languages, or modify the code so that it works in higher dimensions, or modify the code so that it uses templates,

```
struct MyPoint{
  public:
    double a,b; //elements of the vector
    MyPoint(double a1, double a2):a(a1),b(a2){ }
    //add a second point to the current point
    inline MyPoint& operator+(const MyPoint & secondvec){
      a+=secondvec.a;
      b+=secondvec.b;
      return *this;
    }
    //subtract a second point from the current point
    inline MyPoint& operator-(const MyPoint & secondvec) {
      a-=secondvec.a;
      b-=secondvec.b;
    return *this;
    }
    //inner product
    inline double operator*(const MyPoint & secondvec) {
      return sqrt(a*secondvec.a+b*secondvec.b);
    }
};
//Affine transformation in 2D
struct MyAffineTransformation2D{
  public:
    double a11,a12,a21,a22; //elements of the left sub-matrix
    double t1,t2; //elements of the displacement component
    MyAffineTransformation2D(double a, double b,
    double c,double d,double e,double f):
      a11(a),a12(b),a21(c),a22(d),t1(e),t2(f){ }
    //apply the affine transformation to a point
    MyPoint * ActOnVector(MyPoint& v){
      double a = a11*v.a + a12*v.b+t1;
      double b = a21*v.a + a22*v.b+t2;
      MyPoint* p_v = new(MyPoint)(a,b);
      return p_v;
    }
    //apply the left submatrix of the affine transformation to a point
    MyPoint * LeftSubMatActOnVector(MyPoint& v){
      double a = a11*v.a + a12*v.b;
      double b = a21*v.a + a22*v.b;
      MyPoint* p_v = new(MyPoint)(a,b);
      return p_v;
    }
    //add a second matrix to the current matrix
    inline MyAffineTransformation2D& operator+
      (const MyAffineTransformation2D& secondmat) {
```

```
      a11+=secondmat.a11;
      a12+=secondmat.a12;
      a21+=secondmat.a21;
      a22+=secondmat.a22;
      t1+=secondmat.t1;
      t2+=secondmat.t2;
    return *this;
    }
    //subtract a second matrix from the current matrix
    inline MyAffineTransformation2D& operator-
      (const MyAffineTransformation2D& secondmat) {
      a11-=secondmat.a11;
      a12-=secondmat.a12;
      a21-=secondmat.a21;
      a22-=secondmat.a22;
      t1-=secondmat.t1;
      t2-=secondmat.t2;
    return *this;
    }
};
```

DETAILED DESCRIPTION

Alternative Embodiments

In this section we describe various types of spatial agents defined by SADU 114 and local distance measures computed by ECU 116, assuming CSU 113 generates a pair of neighbor mapped (n+1)-combinations.

In one embodiment, a spatial agent consists of a point. We call this point a point-of-action. Comparing two transformed spatial agents involves computing the distance between the two transformed point-of-actions.

In more detail, in SADU 114, for two neighbor mapped (n+1)-combinations associated with two affine transformations $T_1$ and $T_2$, where the two neighbor (n+1)-combinations have a common hyperplane H, a point-of-action is defined by first choosing arbitrarily a point $\vec{p} \in H$, then compute a unit vector $\vec{v}$ perpendicular to H. The point-of-action is computed by $\vec{q} = \vec{p} + \vec{v}$. In ATU 130, two new points $T_1(\vec{q})$ and $T_2(\vec{q})$ are computed by applying the two affine transformations to $\vec{q}$, and in DCU 132 the local distance measure between $T_1$, $T_2$ is computed by $$d(T_1, T_2) = \|T_1(\vec{q}) - T_2(\vec{q})\| \tag{14}$$

Alternatively, a point-of-action can be of any predetermined distance away from the common hyperplane as long as it is not included in common hyperplane, otherwise the local distance measure is obviously 0. The choice of unit distance in this embodiment does not exclude other configurations, it depends both on the problem context and the practitioner's preference of scale.

Figure 17:
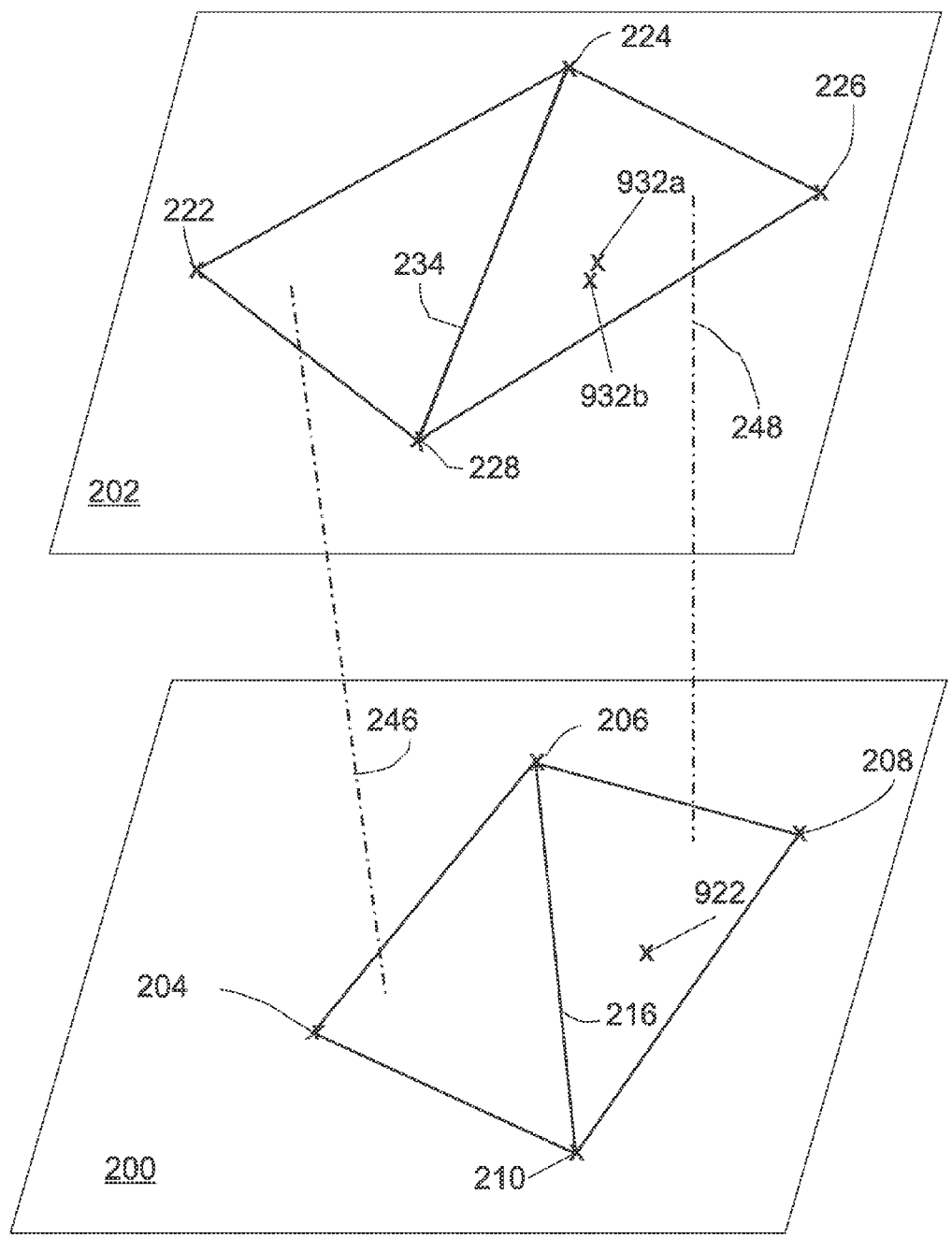
FIG. 17 is an exemplary illustration in 2D of a point-of-action generated for the two neighbor 3-combinations shown in FIG. 7, and two transformed point-of-actions transformed from the point-of-action by the two affine transformations also shown in FIG. 7.

Referring to FIG. 17, it contains an exemplary illustration in 2D of a spatial agent consisting of a point-of-action 922 ($\vec{q}$) that is a unit distance away from the common edge 216 (H), the point-of-action 922 is transformed by the two affine transformations 246 ($T_1$) and 248 ($T_2$) to two points 932a ($T_1(\vec{q})$) and 932b ($T_2(\vec{q})$). Equation 14 computes the distance between the two transformed points.

Figure 18:
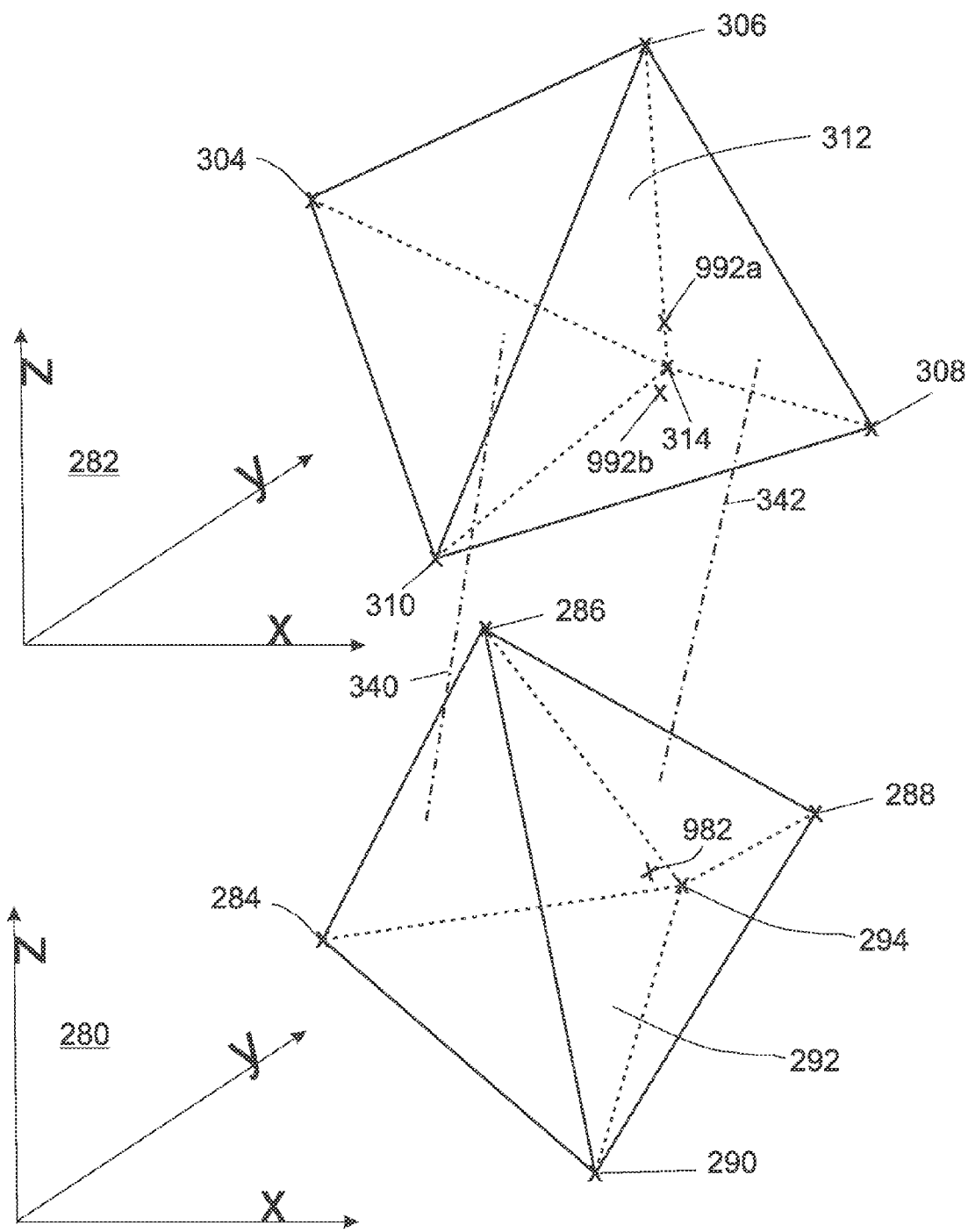
FIG. 18 is an exemplary illustration in 3D of a point-of-action generated for the two neighbor 4-combinations shown in FIG. 8, and two transformed point-of-actions transformed from the point-of-action by the two affine transformations also shown in FIG. 8.

Referring to FIG. 18, it contains an exemplary illustration in 3D of a spatial agent consisting of a point-of-action 982 ($\vec{q}$) that is a unit distance away from the common triangle 292 (H), the point-of-action 982 is transformed by the two affine transformations 340 ($T_1$) and 342 ($T_2$) to two points

992a ($T_1(\vec{q})$) and 992b ($T_2(\vec{q})$). Equation 14 computes the distance between the two transformed points (or point-of-actions).

It is worth mentioning that in Equation 14, only the orthogonal distance between the point-of-action and the common hyperplane matters. We want to show that different point-of-actions in a hyperplane that is parallel to the common hyperplane will generate the same result. To see this, let $\vec{q}_1$ and $\vec{q}_2$ be two distinct points in a hyperplane $H_1$ that is parallel to the common hyperplane H. Then there exist two points $\vec{p}_1$ and $\vec{p}_2$ in H and a vector $\vec{v}$, such that $\vec{q}_1 = \vec{p}_1 + \vec{v}$, $\vec{q}_2 = \vec{p}_2 + \vec{v}$, where v is orthogonal to H. Then, $$\begin{aligned}(T_1(\vec{p}_1 + \vec{v}) - T_2(\vec{p}_1 + \vec{v})) - \\ (T_1(\vec{p}_2 + \vec{v}) - T_2(\vec{p}_2 + \vec{v}))\end{aligned} = A(T_1)(\vec{p}_1 + \vec{v}) + t(T_1) - A(T_2)(\vec{p}_1 + \vec{v}) -$$

$$t(T_2) - (A(T_1)(\vec{p}_2 + \vec{v}) + t(T_1) -$$

$$A(T_2)(\vec{p}_2 + \vec{v}))$$

$$= (A(T_1) - A(T_2))\vec{v} - (A(T_1) - A(T_2))\vec{v}$$

$$= 0$$

Although in this embodiment, a point-of-action is constructed from a common hyperplane, a point-of-action can be provided in various ways. For example, one can first construct a hyperplane that is parallel and a fixed distance from the common hyperplane and then arbitrarily pick a point from the constructed hyperplane as a point-of-action, or a point-of-action can be provided by the application context, which we will illustrate later in another embodiment.

In another embodiment where spatial agents are point-of-actions, in ECU 116 applying an affine transformation to a spatial agent involves applying the left sub-matrix of the affine transformation to the spatial agent.

To see how this works, first notice that equation 14 can be simplified:

$$\|T_1(\vec{q}) - T_2(\vec{q})\| = \|T_1(\vec{p} + \vec{v}) - T_2(\vec{p} + \vec{v})\|$$

$$= \|A(T_1)(\vec{p} + \vec{v}) + t(T_1) - A(T_2)(\vec{p} + \vec{v}) - t(T_2)\|$$

$$= \|(A(T_1) - A(T_2))\vec{p} + (A(T_1) - A(T_2))\vec{v} + t(T_1) - t(T_2)\|$$

$$= \|(A(T_1) - A(T_2))\vec{p} + t(T_1) - t(T_2) + (A(T_1) - A(T_2))\vec{v}\|$$

$$= \|(A(T_1) - A(T_2))\vec{v}\|$$

Accordingly computing the distance between $T_1(\vec{q})$ and $T_2(\vec{q})$ is equivalent to computing $\|(A(T_1) - A(T_2))\vec{v}\|$, which is the length of the vector $\vec{v}$ after being transformed by $A(T_1) - A(T_2)$, the difference of the left sub-matrices of $T_1$, $T_2$ (which is the same as $A(T_1 - T_2)$, the left sub-matrix of the difference $T_1 - T_2$).

In yet another embodiment, instead of constructing spatial agents, in SADU 114 spatial agents are defined to consist of geometric objects provided by the application context. For a pair of neighbor mapped (n+1)-combinations $P_i$, $P_j$ in $V_1$, a spatial agent is a points-of-action consisting of two distinct points $\vec{p}_1$ and $\vec{p}_2$, where $\vec{p}_1 \in P_i$, $\vec{p}_1 \notin P_j$, $\vec{p}_2 \in P_j$, $\vec{p}_2 \notin P_i$. Thus $\vec{p}_1$ is the distinct point of $P_i$ not in $P_j$, and $\vec{p}_2$ is the distinct point of $P_j$ not in $P_i$. Let $S_i$ be the nD simplex corresponding to $P_i$ (i.e., $S_i$ is the convex hull of the points of $P_i$), and $S_j$ be the nD simplex corresponding to $P_j$, then $\vec{p}_1$ is the only vertex of $S_1$ that is not in $S_2$, and $\vec{p}_2$ is the only vertex of $S_2$ that is not in $S_1$. Viewed another way, in this embodiment a points-of-action consists of two point-of-actions. A more general statement is that a spatial agent can be made out of a collection of spatial agents.

In more detail, let $T_1$, $T_2$ be the two affine transformations generated for $P_i$ and $P_j$ respectively, ECU 116 computes a local distance measure for the points-of-action by computing a distance measure $d_1(T_1, T_2) = \|T_1(\vec{p}_1) - T_2(\vec{p}_1)\|$ for the point-of-action $\vec{p}_1$ and a distance measure $d_2(T_1, T_2) = \|T_1(\vec{p}_2) - T_2(\vec{p}_2)\|$ for the point-of-action $\vec{p}_2$. Then the two distance measures are averaged to generate a local distance measure:

$$d(T_1, T_2) = (d_1(T_1, T_2) + d_2(T_1, T_2))/2 \tag{15}$$

There are various ways to compute a local distance measure from two distance measures. (This corresponds to our earlier discussion of generating latter local distance measures from former distance measures.) In one embodiment, a local distance measure is generated by computing the geometric mean of two distance measures. In another embodiment, a local distance measure is generated by computing a weighted sum of two distance measures:

$$d(T_1, T_2) = w_1 d_1(T_1, T_2) + w_2 d_2(T_1, T_2) \tag{16}$$

where $w_1 + w_2 = 1$. The weights, for example, can be determined in proportion to the areas (volumes) of the nD simplices:

$$w_1 = \frac{\text{area}(S_1)}{\text{area}(S_1) + \text{area}(S_2)}, \quad w_2 = \frac{\text{area}(S_2)}{\text{area}(S_1) + \text{area}(S_2)}$$

For example, referring back to FIG. 6, there is a triangulation 482 and a mapping 481. Let $T_1$ be the affine transformation that maps the mapped 3-combination (456, 464, 462) ($P_i$) respectively to the 3-combination (466, 474, 472), and $T_2$ be the affine transformation that maps 3-combination (460, 462, 464) ($P_j$) respectively to 3-combination (470, 472, 474). To compute a local distance measure, we define a points-of-action to consist of points 456 ($\vec{p}_1$) and 460 ($\vec{p}_2$). For the point 456, a first distance $d_1$ is calculated according to Equation 14; for point 460, a second distance $d_2$ is calculated according to equation 14. Finally, a local distance measure is computed using $d(T_1, T_2) = (d_1 + d_2)/2$ according to equation 15.

We want to point out that the above construction is intended to give an exemplary illustration of an application context that provides a points-of-action as a spatial agent. We do not intend to exclude providing spatial agents in other forms.

In yet another embodiment, in 2D, for a pair of neighbor mapped 3-combinations in $V_1$ and two generated affine transformations, a spatial agent consists of three points that are the end points of two orthogonal unit line segments. The two line segments share a common end point, which is contained in the common edge. The other two points are the two line segments' distinct (i.e. not shared) end points, one of which is also contained in the common edge. We call these two line segments a line-segments-of-action. The first line segment with both of its end points contained in the common edge is itself contained in the common edge, thus the two affine transformations map it to a same transformed line segment; on the other hand, the second line segment is mapped by the two affine transformations to two transformed line segments that shares a common end point. Comparing the transformed spatial agents involves not only computing the angle made by the two images of the second line segment at the common end point, but also computing the ratio in their lengths.

In more detail, in SADU 114, for two neighbor mapped 3-combinations having a common edge H in $V_1$, two affine transformations $T_1$, $T_2$ are generated by ACU 112 (before or after the following spatial agent is defined). SADU 114 defines a line-segments-of-action by first arbitrarily pick a point $\vec{p} \in H$ (or the affine hull of H) as the common end point. Let vector $\vec{u}$ be a unit vector parallel to the common edge and $\vec{v}$ be a unit vector perpendicular to the common edge. Then, a first line segment $l_1 = (\vec{p}, \vec{p}+\vec{u})$ is defined by the two end points $\vec{p}$ and $\vec{p}+\vec{u}$ and a second line segment $l_2 = (\vec{p}, \vec{p}+\vec{v})$ is defined by the two end points $\vec{p}$ and $\vec{p}+\vec{v}$.

In ATU 130, the two affine transformations are applied to the line-segments-of-action to get three transformed line segments:

$$T_1(l_1) = T_2(l_1) = (T_1(\vec{p}), T_1(\vec{p}+\vec{u}))$$

$$T_1(l_2) = (T_1(\vec{p}), T_1(\vec{p}+\vec{v}))$$

$$T_2(l_2) = (T_2(\vec{p}), T_2(\vec{p}+\vec{v}))$$

Here $TL_1 = \{T_1(l_1), T_1(l_2)\}$ is the $T_1$ transformed line-segments-of-action, and
$TL_2 = \{T_2(l_1), T_2(l_2)\}$ is the $T_2$ transformed line-segments-of-action.

DCU 132 then compares the transformed spatial agents. Let R be the angle made by $T_1(l_2)$ and $T_2(l_2)$ at $T_1(\vec{p})$, thus R is an angle combinedly defined by $TL_1$ and $TL_2$. The angle can be computed by $$\arccos\left( \frac{\langle T_1(\vec{p}+\vec{v}) - T_1(\vec{p}), T_2(\vec{p}+\vec{v}) - T_2(\vec{p}) \rangle}{\|T_1(\vec{p}+\vec{v}) - T_1(\vec{p})\| \|T_2(\vec{p}+\vec{v}) - T_2(\vec{p})\|} \right)$$

$T_1$ scales $l_2$ relative to $l_1$ by $$S_1 = \frac{\|T_1(l_2)\|}{\|T_1(l_1)\|},$$

where $\|T_1(l_1)\| = \|T_1(\vec{p}+\vec{u}) - T_1(\vec{p})\|$ and $\|T_1(l_2)\| = \|T_1(\vec{p}+\vec{v}) - T_1(\vec{p})\|$; $T_2$ scales $l_2$ relative to $l_1$ by $$S_2 = \frac{\|T_2(l_2)\|}{\|T_2(l_1)\|},$$

where $\|T_2(l_2)\| = \|T_2(\vec{p}+\vec{v}) - T_2(\vec{p})\|$. $S_1$ and $S_2$ are two values of a same geometric property corresponding to $$\frac{\|l_2\|}{\|l_1\|}$$

in the original spatial agent. A local distance measure is computed by:

$$d(T_1, T_2) = |R| + \alpha \left| \max\left( \frac{S_1}{S_2}, \frac{S_2}{S_1} \right) - 1 \right| \qquad (17)$$

where $\alpha$ is a predetermined control parameter.

One would notice that in the above computation, since $$\frac{S_1}{S_2} = \frac{T_2(l_2)}{T_2(l_1)},$$

it is not necessary to compute $\|T_1(l_1)\|$ or $\|T_2(l_1)\|$.

Figure 19:
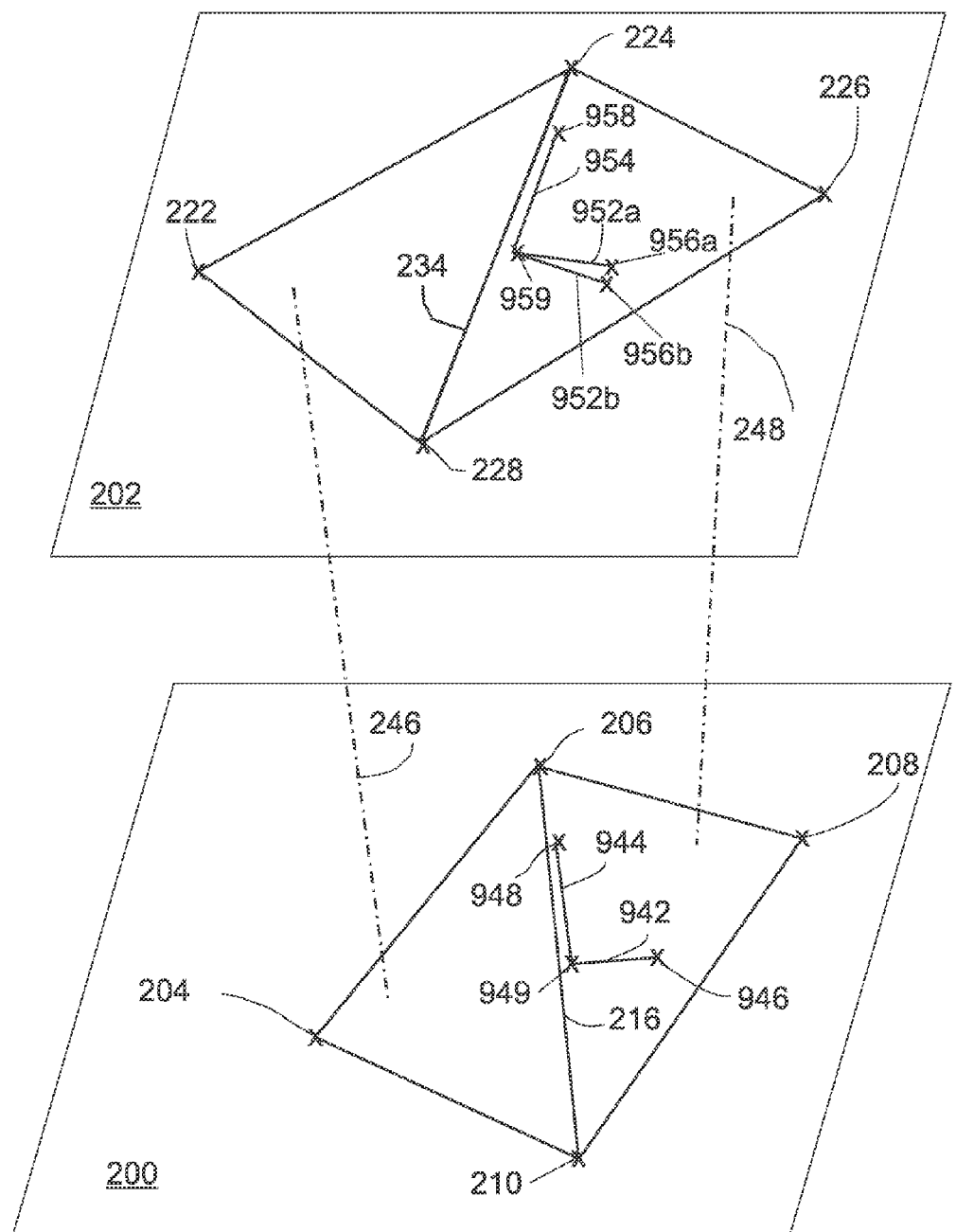
FIG. 19 is an exemplary illustration in 2D of a line-segments-of-action generated for the two neighbor 3-combinations shown in FIG. 7, and two transformed line-segments-of-actions transformed from the line-segments-of-action by the two affine transformations also shown in FIG. 7.

Referring to FIG. 19, it contains an exemplary illustration in 2D of a spatial agent consisting of three end points 946 ($\vec{p}+\vec{v}$), 948 ($\vec{p}+\vec{u}$), 949 ($\vec{p}$). End points 948 and 949 are the end points of a first line segment 944 ($l_1$), which for clarity is drawn a small distance away from the common edge 216 (H), but is understood to be contained in the line passing through the common edge. End points 949 and 946 are the end points of a second line segment 942 ($l_2$), which is perpendicular to the common edge. The two affine transformations 246 ($T_1$) and 248 ($T_2$) both transform the first line segment 944 to a line segment 954 ($T_1(l_1) = T_2(l_1)$), which for clarity is also drawn a small distance away from the line segment 234, but is understood to be contained in the line passing through line segment 234. The line segment 954 is defined by two end points 958 ($T_1(\vec{p}+\vec{u}) = T_2(\vec{p}+\vec{u})$) and 959 ($T_1(\vec{p}) = T_2(\vec{p})$). The second line segment 942 ($l_2$) is transformed to two distinct line segments 952*a* ($T_1(l_2)$) and 952*b* ($l_2(l_2)$) sharing common end point 959. The affine transformation 246 maps point 946 to a point 956*a* ($T_1(\vec{p}+\vec{v})$); the affine transformation 248 maps point 946 to a different point 956*b* ($T_2(\vec{p}+\vec{v})$). R is the angle between the transformed line segment 952*a* and the transformed line segment 952*b*, $S_1$ is the ratio of the length of line segment 952*a* to the length of line segment 954, and $S_2$ is the ratio of the length of line segment 952*b* to the length of line segment 954. These quantities are then used in equation 17 to computes a local distance measure.

Figure 20:
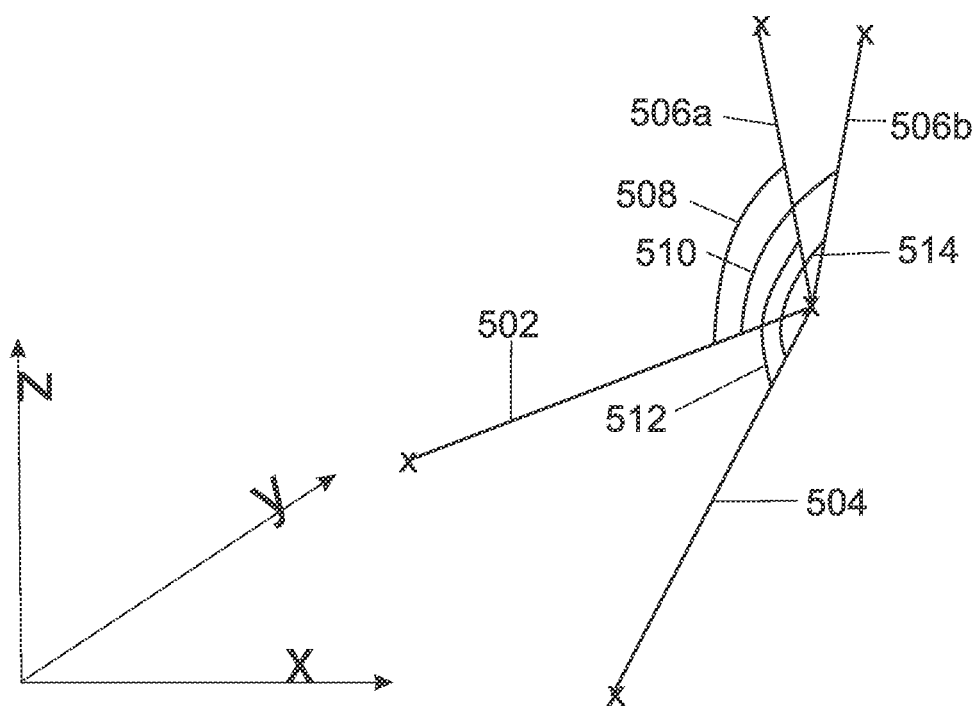
FIG. 20 is an exemplary illustration in 3D of two transformed line-segments-of-actions.

This embodiment can easily be generalized to nD. Here we give a slightly different example, where the spatial agent is still a line-segments-of-action, but the geometric properties are different. In 3-D, FIG. 20 illustrates one embodiment where a spatial agent consists of two orthogonal unit line segments (not shown) in a common surface of a pair of neighbor mapped 4-combinations (not shown), and a third unit line segment (now shown) that is orthogonal to the common surface. The three line segments share a common end point that is contained in the common surface. Because the two affine transformations ($T_1$, $T_2$) generated for the two neighbor mapped 4-combinations agree on the first two line segments, one of the first two line segments is transformed by the two affine transformations to a transformed line segment 502, the other to a transformed line segment 504. The third line segment ($l_3$) that is not in the common surface is transformed by the two affine transformations respectively to a third transformed line segment 506*a* ($T_1(l_3)$) and a fourth transformed line segment 506*b* ($T_2(l_3)$). Then an angle 508, which is made by the first transformed line segment 502 and the third transformed line segment 506*a* at their common end point, is compared with angle 510, which is made by line segment 502 and the fourth transformed line segment 506*b* at their common end point; the angle 512, which is made by the second transformed line segment 504 and the third transformed line segment 506a at their common end point, is compared with angle 514, which is made by the second transformed line segment 504 and the fourth transformed line segment 506b at their common end point. A local distance measure is computed by:

$$d(T_1, T_2) = |R_1 - R_2| + |R_3 - R_4|\alpha \left| \max\left(\frac{T_1(l_3)}{T_2(l_3)}, \frac{T_2(l_3)}{T_1(l_3)}\right) - 1 \right|$$

where for this example $R_1$ is angle 508 made by the first and the third transformed line segments, $R_2$ is angle 510 made by the first and the fourth transformed line segments, $R_3$ is angle 512 made by the second and the third transformed line segments, $R_4$ is angle 514 made by the second and the fourth transformed line segments. $\alpha$ is a predetermined control parameter.

In yet another embodiment in nD, a spatial agent is a points-of-action consisting of two points. But in this embodiment, instead of assuming a pair of neighbor mapped (n+1)-combinations, we assume there are two mapped (n+1)-combinations that have (n−1) points in common.

In more detail, in nD in SADU 114, for two mapped (n+1)-combinations having n−1 points in common, two affine transformations $T_1$, $T_2$ are generated by ACU 112 (before or after the following spatial agent is defined), where the two mapped (n+1)-combinations have either a common point in 2D or a common edge in 3D. Let $\vec{p}$ be the common point in 2D and an arbitrary point in the common edge in 3D. A points-of-action is defined by adding to $\vec{p}$ two vectors $\vec{v}_1$, $\vec{v}_2$ to form 2 distinct end points $\vec{p}+\vec{v}_1$, $\vec{p}+\vec{v}_2$. In 2D, $\vec{v}_1$ and $\vec{v}_2$ may be chosen to be a pair of basis vectors, and in 3D they may be chosen so that $(\vec{p}, \vec{p}+\vec{v}_1), (\vec{p}, \vec{p}+\vec{v}_2)$ and the common edge are linearly independent, or even orthogonal to each other. $\vec{v}_1$ and $\vec{v}_2$ can be chosen by the following procedure: let $\vec{h}$ be a vector in the direction of H, let $\vec{v}$ be a vector that is not parallel to $\vec{h}$, then $\vec{v}_1=\vec{h}\times\vec{v}$, $\vec{v}_2=\vec{h}\times\vec{v}_1$. The set of these two distinct end points is what we define to be a points-of-action in this embodiment (need to be differentiated from a previous embodiment of a points-of-action). Each point of the points-of-action can be regarded as a point of action, thus in ECU 116 for each such point-of-action a distance measure can be computed according to, for example, equation 14. The arithmetic mean of the 2 distance measures is taken to be the local distance measure.

Figure 21:
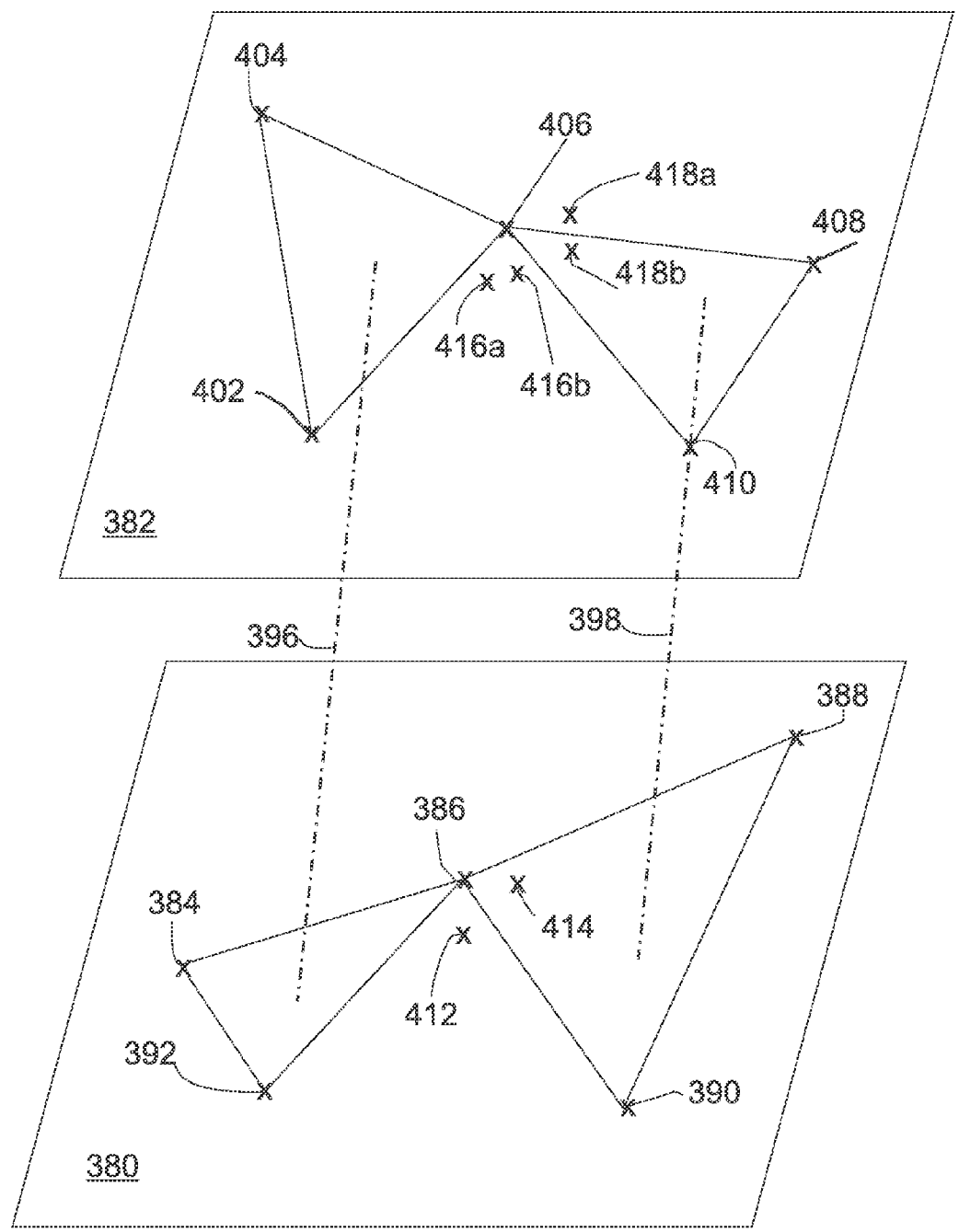
FIG. 21 is an exemplary illustration in 2D of a points-of-action defined for two mapped 3-combinations having one point in common, and two transformed points-of-actions transformed by the two affine transformations generated from the two mapped 3-combinations.

Referring to FIG. 21, which shows an exemplary illustration of two 2D affine transformations 396 ($T_1$) and 398 ($T_2$). The affine transformation 396 maps a 3-combination (384, 386, 392) in a plane 380 respectively to a 3-combination (404, 406, 402) in a plane 382. The affine transformation 398 maps a 3-combination (386, 388, 390) in plane 380 respectively to a 3-combination (406, 408, 410) in plane 382. The affine transformations agree on the point 386 ($\vec{p}$), which both affine transformations transform to point 406 ($T_1(\vec{p})=T_2(\vec{p})$). A points-of-action consists of points 412 ($\vec{p}+\vec{v}_1$) and 414 ($\vec{p}+\vec{v}_2$) where $\vec{v}_1$ and $\vec{v}_2$ are the standard basis in 2D. Point 412 is transformed by affine transformations 396 and 398 respectively to points 416a ($T_1(\vec{p}+\vec{v}_1)$) and 416b ($T_2(\vec{p}+\vec{v}_1)$), point 414 is transformed by affine transformations 396 and 398 respectively to points 418a ($T_1(\vec{p}+\vec{v}_2)$) and 418b ($T_2(\vec{p}+\vec{v}_2)$). Equation 14 is first used to compute the distance between points 416a and 416b, the distance between points 418a and 418b. The arithmetic mean of the two distances may be used as a local distance measure. Alternatively, weighted sum, geometric means, or other methods can be used.

In yet another embodiment, for a set of (n+1)-combinations and the set of generated affine transformations, two or more spatial agents can work together, so that the set of affine transformations transform each of the two or more spatial agents to obtain a distance measure, then correspond to our earlier discussion of generating latter local distance measures from former former distance measures, the distance measures are combined to form a local distance measure for the set of (n+1)-combinations.

I claim:

1. A system for evaluating a one-to-one mapping between a first spatial point set and a second spatial point set in nD, the system comprising:
   (a) a programmable processor; and
   (b) a memory coupled with the programmable processor and embodying information indicative of instructions that cause the programmable processor to perform operations comprising:
      receiving a first and a second spatial point sets and a one-to-one mapping between the two spatial point sets;
      defining a spatial agent;
      generating a plurality of mapped (n+1)-combinations in the first point set;
      computing a plurality of affine transformations that transform said plurality of mapped (n+1)-combinations to correspondents in the second point set;
      applying said plurality of affine transformations to said spatial agent to generate a plurality of transformed spatial agents; and
      computing a distance measure based on said plurality of transformed spatial agents.

2. The system in claim 1, wherein said computing a distance measure comprises computing a local distance measure.

3. The system in claim 2, wherein said operations further comprise triangulating the first point set to obtain a triangulation, said generating a plurality of mapped (n+1)-combinations comprises generating a pair of neighbor mapped (n+1)-combinations induced by said triangulation, said computing a plurality of affine transformations comprises computing two affine transformations based on said pair of neighbor mapped (n+1)-combinations, and said applying comprises applying said two affine transformations to said spatial agent to generate two transformed spatial agents.

4. The system in claim 3, wherein said defining a spatial agent comprises defining a point-of-action, said applying comprises applying said two affine transformations to said point-of-action to generate two transformed point-of-actions, and said computing a local distance measure comprises computing the distance between said two transformed point-of-actions.

5. The system in claim 3, wherein said defining a spatial agent comprises defining a line-segment-of-action, said applying comprises applying said two affine transformations to said line-segment-of-action to generate two transformed line-segment-of-action, and said computing a local distance measure comprises computing the area of the parallelogram spanned by said two transformed line-segment-of-actions.

6. The system in claim 1, wherein said operations further comprise computing an energy score based on one or more of said distance measures.

7. The system in claim 1, wherein said defining a spatial agent comprises defining a basis-of-action and said computing a distance measure comprises computing an overall distance measure.

8. A computer software system having a set of instruction for controlling a general purpose digital computer in evaluating a one-to-one mapping between a first spatial point set and a second spatial point set in nD, comprising a set of instructions organized into a plurality of units, the computer software system comprising:
(a) a spatial agent definition unit configured to define a spatial agent;
(b) a combination selection unit configured to generate a plurality of mapped (n+1)-combinations from the first point set;
(c) an affine calculation unit configured to compute a plurality of affine transformations that transform said plurality of mapped (n+1)-combinations to correspondents in the second point set;
(d) an affine transformation unit configured to apply said plurality of affine transformations to said spatial agent to generate a plurality of transformed spatial agents; and
(e) a distance computation unit configured to compute a distance measure based on said plurality of transformed spatial agents.

9. The computer software system of claim 8, wherein said distance computation unit is configured to compute a local distance measure.

10. The computer software system of claim 9, further comprising a triangulation unit configured to generate a triangulation for the first point set, wherein said affine calculation unit is configured to compute a pair of neighbor mapped (n+1)-combinations induced by said triangulation, said affine calculation unit is configured to compute two affine transformations based on said pair of neighbor mapped (n+1)-combinations, and said affine transformation unit is configured to apply said two affine transformations to said spatial agent to generate two transformed spatial agents.

11. A method of using a computer processor to evaluate a one-to-one mapping between a first spatial point set and a second spatial point set in nD, the method comprising:
(a) receiving a first and a second spatial point sets and a one-to-one mapping between the two spatial point sets;
(b) using said computer processor to define a spatial agent;
(c) using said computer processor to generate a plurality of mapped (n+1)-combinations in the first point set;
(d) using said computer processor to compute a plurality of affine transformations that transform said plurality of mapped (n+1)-combinations to correspondents in the second point set;
(e) using said computer processor to apply said plurality of affine transformations to said spatial agent to generate a plurality of transformed spatial agents; and
(f) using said computer processor to compute a distance measure based on said plurality of transformed spatial agents.

12. The method of claim 11, wherein step (f) comprises using said computer processor to compute a local distance measure.

13. The method of claim 12, further comprising using said computer processor to triangulate the first point set to obtain a triangulation, wherein step (c) comprises using said computer processor to generate a pair of neighbor mapped (n+1)-combinations induced by said triangulation, step (d) comprises using said computer processor to compute two affine transformations based on said pair of neighbor mapped (n+1)-combinations, and step (e) comprises using said computer processor to apply said two affine transformations to said spatial agent to generate two transformed spatial agents.

14. The method of claim 13, wherein step (b) comprises using said computer processor to define a point-of-action, step (e) comprises using said computer processor to apply said two affine transformations to said point-of-action to generate two transformed point-of-actions, and step (f) comprises using said computer processor to computer the distance between said two transformed point-of-actions.

15. The method of claim 13, wherein step (b) comprises using said computer processor to define a line-segment-of-action, step (e) comprises using said computer processor to apply said two affine transformations to said line-segment-of-action to generate two transformed line-segment-of-actions, and step (f) comprises using said computer processor to computer the area of the parallelogram spanned by said two transformed line-segment-of-actions.

16. The method of claim 11 further comprising using said computer processor to compute an energy score based on one or more of said distance measures.

17. The method of claim 11, wherein step (b) comprises using said computer processor to define a basis-of-action and step (f) comprises using said computer processor to compute an overall distance measure.

18. A computer readable storage medium tangibly embodying a computer readable program code having computer readable instructions which when implemented, cause a computer to carry out the steps of a method comprising:
(a) receiving a first and a second spatial point sets and a one-to-one mapping between the two spatial point sets;
(b) defining a spatial agent;
(c) generating a plurality of mapped (n+1)-combinations in the first point set;
(d) computing a plurality of affine transformations that transform said plurality of mapped (n+1)-combinations to correspondents in the second point set;
(e) applying said plurality of affine transformations to said spatial agent to generate a plurality of transformed spatial agents; and
(f) computing a distance measure based on said plurality of transformed spatial agents.

19. The computer readable storage medium of claim 18, wherein said distance measure is a local distance measure.

20. The computer readable storage medium of claim 19, said steps further comprising triangulating the first point set to obtain a triangulation, wherein said plurality of mapped (n+1)-combinations comprises a pair of neighbor mapped (n+1)-combinations corresponding to the vertices of two nD common-hyperplane-sharing simplices of said triangulation, said plurality of affine transformations comprises two affine transformations generated from said pair of neighbor mapped (n+1)-combinations, and said plurality of transformed spatial agents consists of two transformed spatial agents.

21. A system for evaluating a one-to-one mapping between a first spatial point set and a second spatial point set in nD, the system comprising:
means for receiving a first and a second spatial point sets and a one-to-one mapping between the two spatial point sets;
means for defining a spatial agent;
means for generating a plurality of mapped (n+1)-combinations in the first point set;

means for computing a plurality of affine transformations that transform said plurality of mapped (n+1)-combinations to correspondents in the second point set;

means for applying said plurality of affine transformations to said spatial agent to generate a plurality of transformed spatial agents; and means for computing a distance measure based on said plurality of transformed spatial agents.

22. The system in claim 21, wherein said means for computing a distance measure is configured to compute a local distance measure.

23. The system in claim 22, further comprising means for triangulating the first point set to obtain a triangulation, wherein said means for generating a plurality of mapped (n+1)-combinations is configured to generate a pair of neighbor mapped (n+1)-combinations induced by said triangulation, said means for computing a plurality of affine transformations is configured to compute two affine transformations based on said pair of neighbor mapped (n+1)-combinations, and said means for applying said plurality of affine transformations to said spatial agent is configured to apply said two affine transformations to said spatial agent to generate two transformed spatial agents.

* * * * *